US011610001B2

(12) United States Patent
Norden et al.

(10) Patent No.: US 11,610,001 B2
(45) Date of Patent: Mar. 21, 2023

(54) COMPUTER SYSTEM SECURITY SCAN AND RESPONSE

(71) Applicant: Infocyte, Inc., Austin, TX (US)

(72) Inventors: John Keith Norden, Austin, TX (US); Ryan Brandt Morris, Benicia, CA (US); Christopher Michael Gerritz, Austin, TX (US); Tim Jones, McKinney, TX (US)

(73) Assignee: Infocyte, Inc., Austin, TX (US)

( * ) Notice: Subject to any disclaimer, the term of this patent is extended or adjusted under 35 U.S.C. 154(b) by 0 days.

(21) Appl. No.: 17/183,095

(22) Filed: Feb. 23, 2021

(65) Prior Publication Data

US 2022/0269789 A1    Aug. 25, 2022

(51) Int. Cl.
| | |
|---|---|
| G06F 21/00 | (2013.01) |
| G06F 21/57 | (2013.01) |
| G06F 21/54 | (2013.01) |
| G06F 21/55 | (2013.01) |

(52) U.S. Cl.
CPC ............ G06F 21/577 (2013.01); G06F 21/54 (2013.01); G06F 21/554 (2013.01); *G06F 2221/034* (2013.01)

(58) Field of Classification Search
CPC .. G06F 2221/034; G06F 21/554; G06F 21/54; G06F 21/577
USPC .......................................................... 726/25
See application file for complete search history.

(56) References Cited

U.S. PATENT DOCUMENTS

| | | | |
|---|---|---|---|
| 9,083,677 | B1 | 7/2015 | Yu |
| 9,282,110 | B2 | 3/2016 | Zhang et al. |
| 10,404,661 | B2 | 9/2019 | Ettema et al. |
| 10,956,574 | B2 * | 3/2021 | Conikee ................ G06F 21/566 |
| 2016/0119379 | A1 | 4/2016 | Nadkarni |
| 2019/0068640 | A1 * | 2/2019 | Araujo ..................... G06F 21/53 |
| 2019/0147006 | A1 * | 5/2019 | Morris .................. G06F 16/957 |
| | | | 715/205 |
| 2019/0230129 | A1 | 7/2019 | Digiambattista et al. |
| 2020/0128047 | A1 | 4/2020 | Biswas et al. |
| 2020/0204438 | A1 | 6/2020 | Narasimhan et al. |

FOREIGN PATENT DOCUMENTS

| | | | | |
|---|---|---|---|---|
| CN | 102571480 | * | 7/2012 | ............. H04L 47/10 |
| CN | 110069413 | * | 11/2020 | .......... G06F 11/3688 |
| EP | 3355228 A1 | | 8/2018 | |

OTHER PUBLICATIONS

International Search Report for International Application No. PCT/US2022/017492 dated May 27, 2022.

* cited by examiner

*Primary Examiner* — Josnel Jeudy

(74) *Attorney, Agent, or Firm* — Maschoff Brennan

(57) ABSTRACT

A testing computer system communicates with a client computer system coupled to one or more target computer systems. The testing computer system sends test payloads to the client computer system, which are forwarded to the target computer systems. Based on the test results generated by the target computer system, the testing computer system generates a runtime payload that is executable to perform a response to a security breach identified using the test results and sends the runtime payload to the client computer platform for execution. The testing computer system receives from the client computer platform an indication of the execution of the runtime payload.

21 Claims, 15 Drawing Sheets

COMPUTER SYSTEM SECURITY SCAN AND RESPONSE

BACKGROUND

Technical Field

This disclosure relates generally to performing security scans of computer systems and responding to the results of security scans.

Description of the Related Art

Computer systems are frequently attacked by malicious actors seeking to compromise the computer systems to steal information, monitor activities on the computer systems without permission, or gain control of the computer system. Security scans are performed to detect evidence of attacks on computer systems and identify computer systems that have been compromised. Any computer system that is connected to the Internet or any wide area network, either directly or indirectly through another computer system, is potentially at risk.

Figure 1:
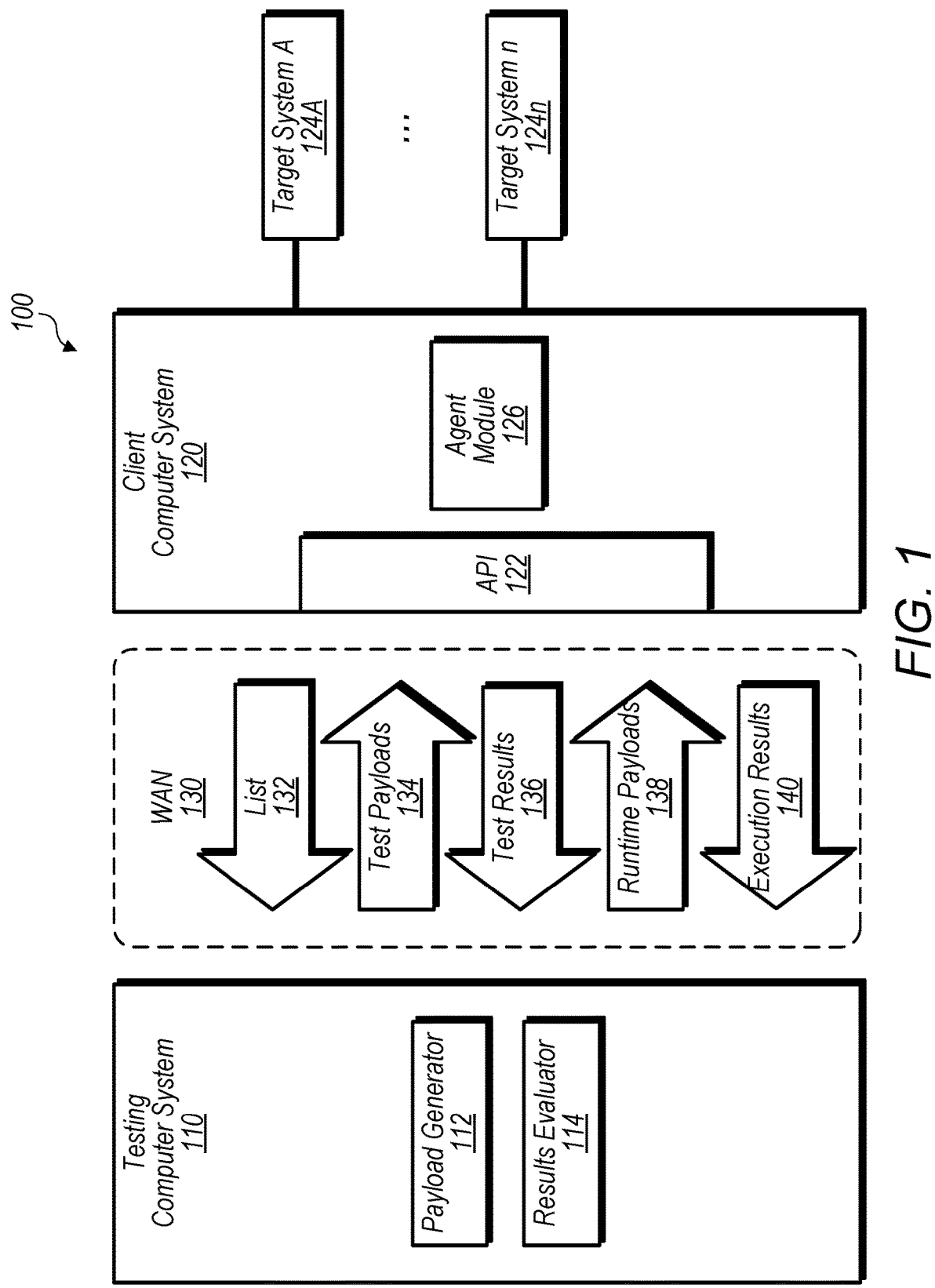
FIG. 1 is a block diagram illustrating an embodiment of a computer system configured to facilitate security scans of target systems in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to send test payloads" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" target systems would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, performing computations in a cloud architecture). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, a cloud-based computing platform according to the present disclosure provides resources for performing cloud-based distributed computing; users may utilize the platform to carry out various tasks using distributed computer resources. Embodiments of the cloud-based computing platform described herein thus enable the functionality of performing computations on distributed computer resources to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

Various third-party testing computer systems exist to facilitate security scans of vulnerable computer systems that may be subject to attacks by malicious actors. Some of such testing computer systems scan the vulnerable computer systems directly, but other testing computer systems leverage the capabilities of the vulnerable computer systems to test themselves. In the latter case, a testing computer system may send information to its client vulnerable computer systems that the client computer systems used to perform the test. In some instances, a client computer system is a platform that implements or communicates with other computer systems, and the testing computer system sends information to the client computer system, which in turn sends information to the other computer systems. In a prior patent application (U.S. patent application Ser. No. 16/455,553 filed Jun. 27, 2019 which is assigned to the same applicant as this application and is hereby incorporated by reference in its entirety), the inventors described techniques relating to conducting a security scan of a client computer system by sending test payloads from a testing computer system to the client computer system, which in turn sends the test payloads to one or more target systems coupled to the client computer system. The techniques in U.S. patent application Ser. No. 16/455,553 enable security scans to be performed on target systems that are (a) not directly accessible to the testing computer system (e.g., because they do not have a network address that is accessible to the testing computer system), and/or (b) without having to install software that persists on the client computer system. While these techniques are useable to identify security threats, the techniques discussed below enable responses to such identified security threats to be deployed. Moreover, the techniques discussed below also enable a testing computer system to send any of a number of commands to the client computer system and/or target systems even without running a security scan or identifying a security threat.

Referring now to FIG. 1, a block diagram illustrating a computer system 100 including a testing computer system 110, a client computer system 120, and one or more target systems 124 is depicted.

In various embodiments, testing computer system 110 includes a payload generator 112 and a results evaluator 114 and communicates with client computer system 120 over a wide area network (WAN) 130. Testing computer system 110 can be implemented by any of a number of suitable computer systems (e.g., testing computer system 110 can be a single computer or server, one or more dedicated computer systems including multiple computer systems, or implemented with a cloud computing system). In various embodiments, testing computer system 110 communicates with WAN 130 using one or more wired and/or wireless communications mediums. In various embodiments, testing computer system 110 is configured to determine a list of target systems 124 coupled to the client computer system 120 (e.g., using list 132), generate respective test payloads 134 with payload generator 112 for a set of the target systems 124 (i.e., one or more target systems on list 132), and to send the test payloads 134 to the client computer system 120 for forwarding to the set of target systems 124. As discussed herein, the test payloads 134 are useable by respective target systems 124 to perform a security scan of the respective target systems 124 and send test results 136 to the testing computer system 110. In various embodiments, the test payloads 134 also include instructions that cause the test payloads 134 to be deleted after the security scan is performed. In various embodiments, testing computer system 110 is configured to receive and evaluate test results 136 to determine whether any of the set of target systems 124 is implicated in a security breach.

Testing computer system 110 is configured to generate, using payload generator 112, and send to client computer system 120 one or more runtime payloads 138 for client computer system 120 to perform (e.g., to respond to a security breach, to install additional software on client computer system 120 and/or target systems 124, etc.). In some of such embodiments, runtime payload 138 is generated in response to test results 136 to ameliorate one or more security breaches (e.g., terminating one or more instances of malicious processes executing on client computer system 120 and/or a target system 124) identified as a result of client computer system 120 and/or target systems 124 performing a scan using test payloads 134. In various embodiments, runtime payload 138 is generated in response to a user selection of one or more responses to the security breach. In various embodiments, testing computer system 110 is configured to receive execution results 140 that are indicative of the results of client computer system 120 performing runtime payloads 138 (e.g., confirmation that a malicious process has been terminated). Testing computer system 110, payload generator 112, and results evaluator 114 are discussed in further detail herein with reference to FIG. 2.

In various embodiments, client computer system 120 can be implemented by any of number of computer systems (e.g., client computer system 120 can be implemented with a single computer or server, one or more dedicated computer systems including multiple computer systems, or implemented with a cloud computing system). In some embodiments, client computer system 120 is implemented on any of a number of cloud-based computing platforms (e.g., Amazon Web Services®, Microsoft Azure®, Google® Cloud). In some instances, client computer system 120 is a commercially available, pay-as-you-go platform that enables users to provision and use one or more virtual machines. In various embodiments, client computer system 120 has installed on it an agent module 126 (also referred to herein as an agent program) that is operable to facilitate the interaction between testing computer system 110 and client computer system 120 as discussed herein. In various embodiments, agent module 126 is software running on client computer system 120 that is installed by testing computer system 110. In particular, in various embodiments agent module 126 is operable to receive test payloads 134 and forward them to one or more target systems 124 for execution, assemble results from the target systems 124 into test results 136 for transmission to testing computer system 110, receive runtime payloads 138 and execute them on client computer system 120 (and/or forward them to target systems 124 for execution), and send execution results 140 to testing computer system 110. List 132, test payloads 134, test results 136, runtime payloads 138, and execution results 140 are discussed in further detail in reference to FIGS. 2, 3, and 4.

In various embodiments, application programming interface (API) 122 is a set of subroutine definitions and communication protocols that define methods of communication between client computer system 120 and computer systems coupled to WAN 130. Using API 122, testing computer system 110 is able to send and receive messages containing information and/or commands to client computer system 120 including but not limited to list 132, test payloads 134, test results 136, runtime payloads 138, and execution results 140 in various embodiments.

In various embodiments, client computer system 120 is coupled to one or more target systems 124 (e.g., target systems 124A-n). In these embodiments, target systems 124 are able to communicate with client computer system 120 (e.g., via HTTP). As discussed herein in reference to FIG. 3, in various embodiments, target systems 124 are implemented within client computer system 120 and/or on one or more remote computer systems. In either instance, because the various target systems 124 are able to communicate with the client computer system 120, these target systems 124 are referred to herein as being "coupled to" client computer system 120. Thus, being "coupled to" client computer system 120 includes (a) being coupled by a communications channel between client computer system 120 and a remote target system 124, or (b) being coupled by a communications channel within client computer system 120 for target systems 124 implemented by client computer system 120. In various embodiments, target computer systems 124 include but are not limited to databases, user devices such as laptops or workstations, web servers, etc. Target systems 124 are configured to run a security scan upon receiving respective test payloads 134 from client computer system 120, generate results of the security scan, and send the test results 136 to client computer system 120 for forwarding to testing computer system 110. In some embodiments, especially with regard to target systems 124 that are remote from client computer system 120, these target systems 124 are configured to run a security scan upon receiving respective test payloads 134 from client computer system 120, generate results of the security scan, and send the test results 136 to testing computer system 110 directly (i.e., not via client computer system 120). Similarly, in various embodiments, target systems 124 are configured to respond to runtime payloads 138 executed by client computer system 120 (e.g., a runtime payload 138 causes client computer system 120 to issue commands to one or more target systems 124 which the one or more target systems follow) and/or to execute runtime payloads 138 themselves after such runtime payloads are forwarded by agent module 126. Client computer system 120, API 122, target systems 124, and agent module 126 are discussed in further detail herein with reference to FIG. 3.

WAN 130 is one or more wired and/or wireless networks via which testing computer system 110 and client computer system 120 are configured to communicate (e.g., messages including list 132, test payloads 134, test results 136, runtime payloads 138, execution results 140). In various embodiments, WAN 130 includes the Internet. Each device that is coupled to WAN 130 has a publicly accessible address (e.g., a public IP address, an Internet IP) useable to differentiate each device from the other devices coupled to WAN 130. As discussed herein, various target systems 124 are not directly coupled to WAN 130 and do not have publicly accessible address. Instead, the various target systems 124 have private addresses (e.g., private IP addresses, local IP addresses) to facilitate communication via one or more local networks, but such private addresses are not exposed to WAN 130. In various embodiments, when a device (e.g., a target system 124) without a publicly accessible address receives or sends information via WAN 130 via a message, a device (e.g., a router) translates the message through a publicly accessible address, which is useable to communicate the message with other publicly accessible addresses and eventually to other local networks. Thus, various target systems 124 have access to WAN 130, but indirectly (e.g., though a router).

However, because private addresses are not visible on WAN 130, such architecture prevents testing computer system 110 from identifying target systems 124 that do not have publicly accessible addresses. Accordingly, testing computer system 110 is unable to determine a list of all of the target systems 124 that sit behind the publicly accessible address(es) used by client computer system 120. In various embodiments, testing computer system 110 requests list 132 from client computer system 120. In various embodiments, list 132 includes indications of a plurality of target systems 124 as well as indications of hardware, software, and/or settings of the target systems 124 that testing computer system 110 is configured to use to determine test payloads 134 and/or runtime payloads 138 for a set of the target systems 124 as discussed herein. After testing computer system 110 sends the test payloads 134 to client computer system 120, client computer system 120 forwards the test payloads 134 to their respective target systems 124 who perform security scans and generate test results 136. Client computer system 120 sends test results 136 to testing computer system 110, which evaluates the test results using results evaluator 114.

Similarly, in various embodiments, testing computer system 110 may not be able to communicate with one or more target systems 124 to provided instructions on how to the target systems 124 should respond to one or more issues identified in a security scan, but testing computer system 110 is operable to send runtime payloads 138 to agent module 126, which in turn can effectuate the performance of the runtime payloads 138 by the various target systems 124 using the architecture of client computer system 120. For example, in various embodiments agent module 126 is implemented by client computer system 120 with administrator access privileges to client computer system 120 and the various target systems 124. Thus, in various embodiments, through agent module 126 testing computer system 110 is operable to cause client computer system 120 and target systems 124 to perform any of a number of actions in response to the results of a security scan (e.g., terminating processes, updating software or firmware, restarting physical or virtual machines, etc.) as discussed herein. Similarly, in various embodiments, this same architecture allows testing computer system 110, through agent module 126, to cause client computer system 120 and target system 124 to perform any action that an administrator-level user of client computer system 120 is authorized to do including but not limited to provisioning or deprovisioning additional target systems 124; deploying monitoring software; and installing, updating, or deleting software on client computer system 120 and/or target systems 124.

As discussed in further detail below, in various embodiments both the test payloads 134 and the runtime payloads 138 may be performed without having to install software other than agent module 126 on client computer system 120. Accordingly, in various embodiments the techniques disclosed herein enable testing computer system 110 to perform security scans of client computer system 120 (and target systems 124) and to send to messages to client computer system 120 to effectuate a response to the results of the security scan without installing software other than agent module 126 on client computer system 120. In various embodiments, the test payloads 134 also include instruction to delete the test payloads 134 after the security scan. Similarly, in various embodiments, the runtime payloads 138 also include instruction to delete the runtime payloads 138 after executing. In other embodiments, test payloads 134 and/or runtime payloads 138 do not include instructions to delete the test payloads 134 and/or runtime payloads 138, but are scripts that are not retained in memory on target systems 124 or client computer system 120 after the scripts have been performed. In such embodiments, the test payloads 134 and runtime payloads 138 are overwritten when the target systems 124 load other operations (e.g., operations for programs installed on target system 124) into memory. In embodiments, because these test payloads 134 and runtime payloads 138 are only delivered and executed on demand, long term performance side effects (e.g., reduced cloud performance and higher hosting costs due to overprovisioning or slower processing times) are reduced or eliminated.

Figure 2:
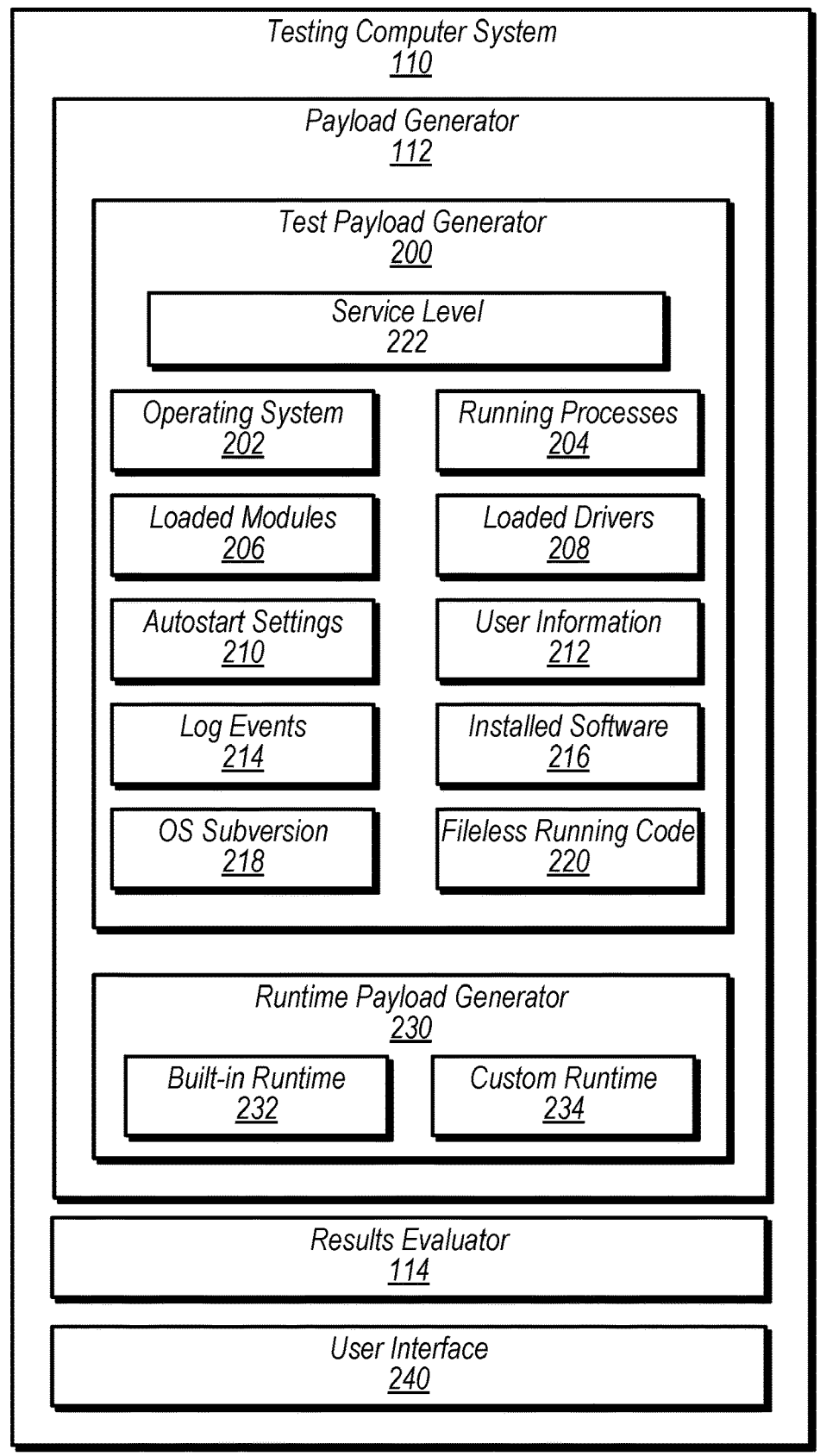
FIG. 2 is an expanded block diagram of the testing computer system of FIG. 1 in accordance with various embodiments.

Referring now to FIG. 2, an expanded block diagram of testing computer system 110 is depicted. In the embodiments shown in FIG. 2, testing computer system 110 includes payload generator 112 and results evaluator 114 shown in FIG. 1 and a user interface 240. Testing computer system 110 is configured to communicate with client computer system 120 to receive list 132, determine a set of target systems 124 to test, generate and send test payloads 134, receive and evaluate results 136, generate and send runtime payloads 138, receive execution results 140, and present information to a user via user interface 240.

In various embodiments, payload generator 112 includes a test payload generator 200 and a runtime payload generator 230. In various embodiments, test payload generator 200 includes a plurality of modules operable to generate test payloads 134 including but not limited to service level module 222, operating system (OS) module 202, running processes module 204, loaded modules module 206, loaded drivers module 208, autostart settings module 210, user information module 212, log events module 214, installed software module 216, OS subversion module 218, and fileless running code module 220. In various embodiments, test payload generator 200 includes all of these modules, but in other embodiments payload test payload generator 200 includes additional modules (e.g., modules that add additional tests to the test payloads 134) or fewer modules.

Service level module 222 is operable to determine the set of target systems 124 to test. In some embodiments, the set includes each of the target systems 124 on list 132. In other embodiments, the size of the set of target systems 124 to test is limited by a service level (e.g., a lower level of service in which only a subset of target systems 124 are tested). In other embodiments, service level module 222 receives an indication (e.g., scan request 310 discussed in connection to FIG. 3) and focus the test on a subset of target systems 124 based on the indication (e.g., scan request 310 indicates that database target systems 124 should be tested but user workstation target systems 124 should not be tested, scan request 310 indicates a potential security breach in certain target systems 124).

The various modules 202-220 are executable to add operations to the test payloads 134 to gather details regarding the running state of a target system 124, without the requirement to install heavy software or rely on other tooling such as logs or existing security apparati. In various embodiments, because the hardware, software, and settings of various target systems 124 vary, test payloads 134 for different types of target systems 124 also vary. List 132 includes indications of a plurality of target systems 124 as well as indications of hardware, software, and/or settings of the target systems 124. Payload generator 112 and the various modules 202-220, therefore, are operative to assemble different test payloads 134 for different configurations of target systems 124 based on the indications in list 132. For example, in various embodiments, first test payloads 134 are generated for target systems 124 having a first OS and second, different test payloads 134 are generated for target systems 124 having a second, different OS. In another example in various embodiments, first test payloads 134 are generated for target systems 124 implemented within client computer system 120 and second test payloads are generated for target systems 124 implemented on computer systems that are remote from client computer system 120.

In various embodiments, OS module 202 is executable to include operations for the security scan caused by target systems 124 executing test payloads 134 that: determine version and architecture information about the OS running on the target systems 124 and, in some embodiments, also determine patch information about the OS running on the target systems 124.

In various embodiments, running processes module 204 is executable to include operations for the security scan caused by target systems 124 executing test payloads 134 that: determine what programs and processes are being executed on target systems 124, and in embodiments, collect binary metadata along with associated user accounts and process identification data.

In various embodiments, loaded modules module 206 is executable to include operations for the security scan caused by target systems 124 executing test payloads 134 that: determine loadable modules running on target system 124. Modern OSs share common code/functionality through loadable modules (e.g., generally .dll files on Microsoft Windows®, .so files on Linux®, and .dylib files on macOS®). Malicious applications can inject modules into running processes to change their behavior and subvert detection mechanisms. In various embodiments, the security scan collects binary metadata as well as what process(es) they are loaded in.

In various embodiments, loaded drivers module 208 is executable to include operations for the security scan caused by target systems 124 executing test payloads 134 that: obtain a list of low-level drivers in use by the OS. Drivers generally provide access to hardware but also serve to provide additional functionality to the OS itself. Malware can attempt to install a malicious driver to subvert detection mechanisms that take place in non-kernel managed space, called user space/user land. In various embodiments, the security scan collects binary metadata for this list of drivers.

In various embodiments, autostart settings module 210 is executable to include operations for the security scan caused by target systems 124 executing test payloads 134 that: obtain the list of events during various boot or login events. These are grouped together under the term "autostarts" and executed automatically and without user interaction (automatically). For example, on Microsoft Windows® autostarts can include things like scheduled tasks, login triggers, items listed in various registry locations known as "run keys", along with many others. As another example, on Unix®-like systems this can include things like cron jobs, user profile scripts, systemd or upstart services, etc. In various embodiments, the security scan enumerates all of these various locations and lists the entries found along with binary metadata about the files themselves.

In various embodiments, user information module 212 is executable to include operations for the security scan caused by target systems 124 executing test payloads 134 that: obtain information about user accounts on target system 124. In various embodiments, this includes but is not limited to (a) collecting information about the local users that have accessed the system, (b) collecting information about network users that have accessed the system, and/or (c) collecting information about access times and/or account privileges of users of local users or network users.

In various embodiments, log events module 214 is executable to include operations for the security scan caused by target systems 124 executing test payloads 134 that: check logs from one or more built-in logging features of the OS of the target system 124 or any other program running on target system 124. In various embodiments, security scans may collect, for example, time and detail information for user login events and/or potentially malicious events such as log or audit clearing events.

In various embodiments, installed software module 216 is executable to include operations for the security scan caused by target systems 124 executing test payloads 134 that: gather a list of what software is installed on target system 124. In various instances, this information is useful for auditing what the user(s) of target system 124 have done. In other instances, this can also identify if known malware or software vulnerable to exploit is present within a target system 124.

In various embodiments, OS subversion module 218 is executable to include operations for the security scan caused by target systems 124 executing test payloads 134 that: check for malicious methods intended to alter the way the OS of target system 124 functions. For example, a technique known as "hooking" a code execution path involves modifying the way internal code functions, often to mask activity or provide incorrect results to user applications. In various embodiments, the security scan looks at how important functions are supposed to be executed, and inspects current running processes to ascertain whether or not that is how they are functioning on target system 124. In such instances, discrepancies are reported as results 136.

In various embodiments, fileless running code module 220 is executable to include operations for the security scan caused by target systems 124 executing test payloads 134 that: check for "fileless execution" of malware. Many types of malware attempt to hide their execution using a variety of techniques known as "fileless execution." In various instances, this can be a script that is run without saving the file to disk or a full executable loaded into the memory of another running process and then executed. If a security scan's detection mechanism relies on being able to inspect files saved to a disk, such techniques might not be detected by the security scan. Operations to check for fileless execution enable the security scan to inspect the memory area of running applications on the target system 124 and identifies code in execution that should not be there. In various embodiments, these findings are reported in the test results 136 as well as the binary data of the code in question.

Results evaluator 114 is operable to interpret test results 136 and determine whether a particular target system is implicated in a security breach. In some embodiments, results evaluator 114 is deterministic and looks for specific behaviors or results (e.g., the name of known malware installed on target computer 124, the presence of known malicious modules on target system 124). Additionally or alternatively, in some embodiments, results evaluator 114 is statistical and looks for trends in test results 136 that are probabilistically associated with compromised systems. For example, results evaluator 114 includes a model and uses machine learning techniques to determine whether test results 136 from a particular target system 124 indicate that the particular target system 124 has been compromised. In either or both such embodiments, if such specific behaviors or results are detected and/or comparison to a model indicates that a target system 124 is compromised, then results evaluator 114 reports that the target system 124 may be compromised and identifies the area(s) of concern.

In various embodiments, runtime payload generator 230 is operable to generate runtime payloads 138 to effectuate responses to security scans. In various embodiments, runtime payload generator 230 includes a built-in runtime module 232 and a custom runtime module 234 useable to generate runtime payloads 138 to perform built-in responses useable on multiple different client computer systems 120 and custom responses that are specific for a particular client computer system 120, respectively. While the operation of runtime payload generator 230 is discussed herein primarily as effectuating responses to the results of a security scan, it will be understood that in various embodiments, runtime payload generator 230 can generate runtimes to effectuate execution of any of a number of actions by client computer system 120 whether a security scan is performed or not (e.g., effectuating a patch of software on target systems 124 or restarting target systems 124 without performing a security scan as discussed herein). Built-in runtime module 232 includes one or more routines or scripts that are operable to be compiled and performed on any client computer system 120 and include but is not limited to terminating one or more particular processes, isolating target systems 124 from other target systems 124 (e.g., to keep malicious code from spreading), quarantining files, and performing further investigation of a security breach (e.g., performing a more extensive scan of one or more target systems 124, recovering files on a target system 124, etc.). Custom runtime module 234 includes one or more custom routines or scripts that are entered by a user on behalf of a particular client computer system 120 (and/or target systems 124) and operable to be compiled and performed by the particular client computer system 120 (and/or target systems 124). Examples of custom routines or scripts includes but are not limited to installing, updating, or patching software on client computer system 120; installing, updating, or patching software on one or more target computer systems 124; entering commands to software installed on client computer system 120 and/or target computer systems 124 (e.g., a command to run an instance of particular software installed on a target computer system 124), etc. In various embodiments, runtime payload generator 230 is operable to compile source code into runtime binary (a) suitable for running on client computer system 120 based on the hardware and software used to implement client computer system 120 and/or (b) suitable for running on target systems 124 based on the hardware and software used to implement target systems 124. For example, in embodiments where client computer system 120 is implemented by a particular cloud-based computing platform, runtime payload generator 230 is operable to generate binary runtime files suited to the particular cloud-based computing platform. In various embodiments, runtime payload generator 230 is operable to compile runtimes for any number of operating system, hardware and software architectures, and cloud-based computing platforms. For example, in embodiments where one or more target systems 124 are implemented using Windows OS, runtime payload generator 230 is operable to compile runtimes that are executable on Windows OS.

User interface 240 is operable to present information to a user of testing computer system 110 about security scans performed as a result of execution of test payloads 134, about results 136 of a security scan, about available responses that may be effectuated using runtime payload generator 230, and/or about the status of responses being performed. As discussed in further detail in reference to FIGS. 4 and 9-14, user interface 240 is operable to present information to and receive commands from a user computer system (e.g., user computer system 400 shown in FIG. 4).

Figure 3:
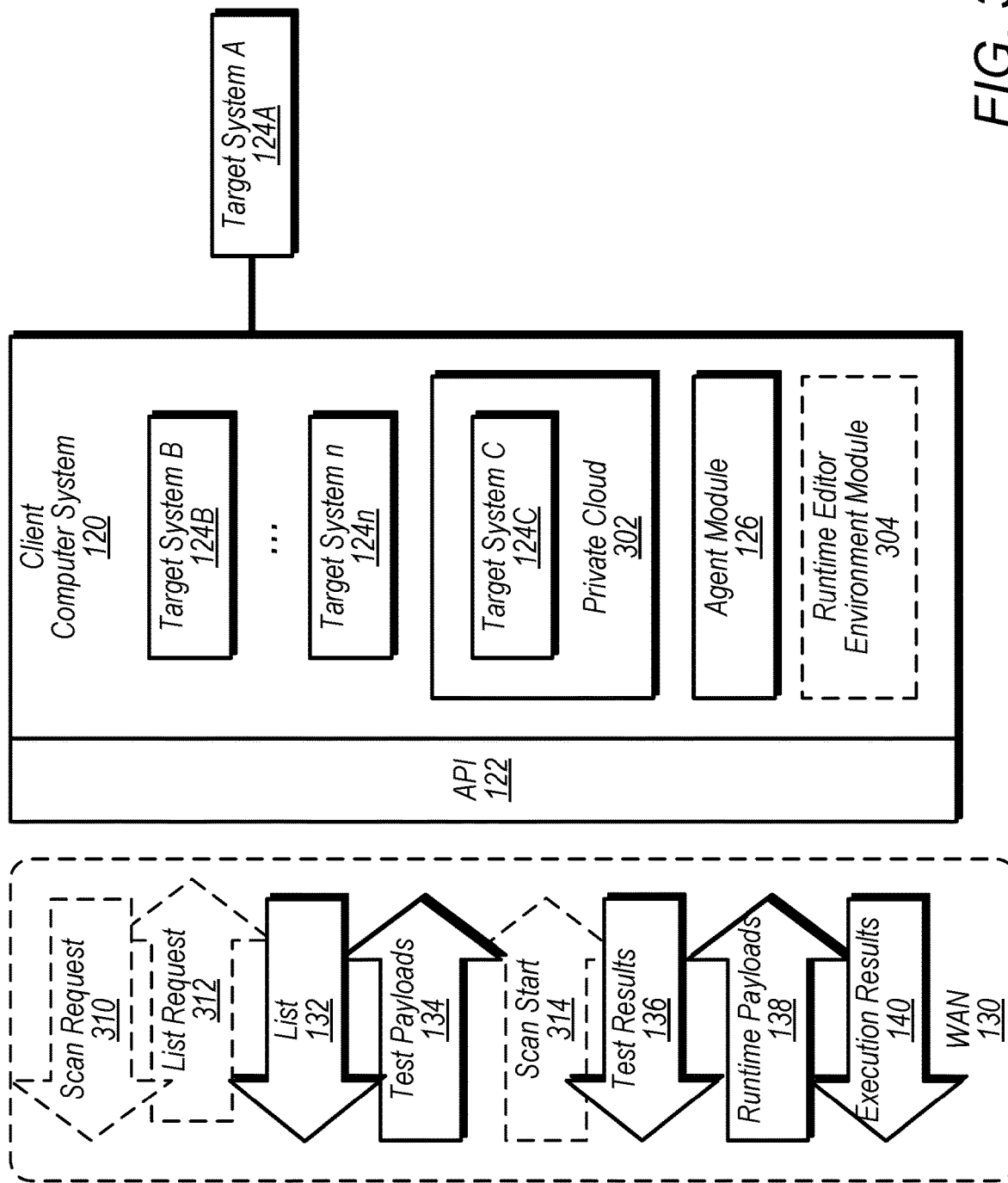
FIG. 3 is an expanded block diagram of the client computer system of FIG. 1 in accordance with various embodiments.

Referring now to FIG. 3, an expanded block diagram of client computer system 120 is depicted. As in FIG. 1, client computer system 120 includes API 122 and agent module 126. The client computer system 120 depicted in FIG. 3 additionally includes a plurality of target systems 124 implemented by client computer system 120 including a target system 124C implemented with private cloud 302 and a runtime editor environment module 304. In various embodiments, client computer system 120 is also configured to send or receive a scan request 310, a list request 312, and/or a scan start command 314 in addition to being configured to send or receive list 132, test payloads 134, test results 136, runtime payloads 138, and execution results 140 as discussed herein. In various embodiments, client computer system 120 does not include all of the elements depicted in FIG. 3. For example, client computer system 120 does not include a private cloud or runtime editor environment module 304 in various embodiments. As another example, client computer system 120 might send a single message combining scan request 310 and list 132 without receiving list request 312.

In various embodiments, agent module 126 is software that is installed on client computer system 120 and facilitates the running of security scans (e.g., by executing test payloads 134 and/or distributing test payloads 134 to target systems 124, by assembling and communicating test results 136) and the execution of runtime payloads 138 (e.g., by executing the runtime binary in runtime payloads 138 and/or by distributing runtime payloads 138 to target systems for execution). In some embodiments, agent module 126 executes the runtime binaries within client computer system 120 which causes the client computer system 120 (and the target systems 124 implemented by and in communication with client computer system 120) to perform whatever actions are dictated by the runtime payload 138. In other embodiments, runtime payloads 138 indicate a particular target system 124 and agent module 126 forwards such runtime payloads 138 to the particular target system 124 for execution. In some of such embodiments, agent module 126 gathers information about the progress of the execution of the runtime payloads 138 and communicates such information back to testing computer system as execution results 140.

In various embodiments, agent module 126 is operable to provide a runtime editor environment via runtime editor environment module 304. For the purposes of discussion herein, runtime editor environment module 304 is depicted as being a separate module from agent module 126, but in various embodiments, runtime editor environment module 304 is a component of agent module 126. As discussed in further detail in reference to FIGS. 4 and 9-14, the runtime editor environment provided by runtime editor environment module 304 is useable to provide a user with the ability to code custom scripts or routines to be executed on client computer system 120. Such custom scripts or routines may be sent from client computer system 120 to testing computer system 110 (e.g., custom scripts 410 shown on FIG. 4) and may be compiled by runtime payload generator 230 of testing computer system 110 to generate runtime binary which can be sent back to the client computer system 120 as one or more runtime payloads 138 in various embodiments. As discussed herein, in various embodiments agent module 126 is operable effectuate the execution of such runtime payloads 138 by executing the runtime payloads 138 and/or distributing them to target systems 124.

In various embodiments, agent module 126 is also operable to monitor client computer system 120 and/or one or more target system 124 to determine whether to initiate a security scan. In some embodiments, agent module 126 receives an indication that a security breach is suspected to have occurred at one or more target systems 124. In such embodiments, agent module 126 in turn sends scan request command 314 to testing computer system 110 to initiate the security scans as discussed herein. For example, IT personnel associated with the entity operating client computer system 120 could receive an indication that a security breach has occurred by seeing that confidential information from a target system 124 (e.g., user account information) has been posted on the internet, and the IT personnel send an indication to agent module 126 (e.g., via a GUI), and agent module 126 sends scan request message 310. Additionally or alternatively, agent module 126 monitors for the provisioning of new target systems 124 or receives an indication from client computer system 120 that new target systems 124 have been provisioned. In some of such embodiments, agent module 126 sends scan request 310 to initiate a security scan of target systems 124 to form a baseline for subsequent security scans (i.e., a brand new target system 124 is unlikely to have been attacked already, so the test results 136 from the new target system 124 could be used to compare with future scans). Additionally or alternatively, agent module 126 causes the security scan to be initiated periodically (e.g., every week, every month, every two months, etc.).

In the embodiment shown in FIG. 3, client computer system 120 is coupled to target system A 124A and implements target systems 124B, 124C, and 124n. In various embodiments, target system 124A is implemented on a third computer system that is remote from client computer system 120. Thus, in various embodiments target system 124A is implemented on a separate client computer system 120 or in separate computer system (e.g., a desktop computer, a laptop, a server, or a private data center). In some embodiments, target system 124A is located on the premises of the entity that is utilizing the cloud computing platform. Target systems 124B, 12C, through 124n are implemented by client computer system 120.

In various embodiments, client computer system 120 implements one or more target systems 124 (e.g., target system 124C shown in FIG. 3) in a private cloud 302. In various embodiments, private cloud 302 is a logically isolated section of client computer system 120 where resources can be launched in a virtual network that is defined by an entity using client computer system 120. In various embodiments, the virtual networking environment of private could 302 is controllable down to the selection of IP address ranges, the creation of subnets, and the configuration of route tables and network gateways. As discussed herein, in some embodiments, some target systems 124 (e.g., target systems 124B-124n shown in FIG. 3) have publicly accessible address on WAN 130 that can be accessed via WAN 130 while other target systems (e.g., target system 124A and target system 124C shown in FIG. 3) do not have publicly accessible addresses on WAN 130.

Accordingly, an entity (e.g., an online storefront, an online service provider) utilizing client computer system 120 to perform tasks (e.g., the tasks associated with the online store or online service) is able to use client computer system 120 to coordinate the performance of these tasks using various target systems 124 that are implemented within client computer system 120 or remote from client computer system 120. In one non-limiting example, an entity providing online media streaming services can use client computer system 120 to provision a public-facing subnet (e.g., a website that serves the streaming media) with target systems 124B-n such that users can access the website over WAN 130. In this example, target system 124C is a database storing media and is implemented within private cloud 302 that is not directly accessible via WAN 130, but is in communication with the public-facing subnet such that media from the database can be streamed to users via the website. In this example, target system 124A is a development server located in a private datacenter belonging to the entity that is used by developers to test new features for the website. In this example, because all of target systems 124A, 124B, 124C, and 124n are in communication with (or implemented by) client computer system 120, each of these target systems 124 can be scanned as discussed herein without implementing persistent scanning software (other than agent module 126) on the target system 124 even though target systems 124A and 124C are not directly accessible via WAN 130. Similarly, through runtime payloads 138 sent to client computer system and executed by (or using) agent module 126, testing computer system 110 can effectuation the execution of various types of commands (e.g., commands to terminate a process, commands to install or update software) by any of these target systems even though target systems 124A and 124C are not directly accessible via WAN 130.

In various embodiments, testing computer system 110 sends list request 312 to client computer system 120. In such embodiments, list request 312 requests that client computer system 120 provide list 132, which includes indications of a plurality of target systems 124 as well as indications of hardware, software, and/or settings of the target systems 124 in various embodiments as discussed herein. In some embodiments, list requests 312 requests a list 132 of all target computer systems 124 in communication with (or implemented by) client computer system 120 that are operated for a particular entity (e.g., an online storefront, an online service provider). In other embodiments, list request 312 requests a list 132 for a subset of target computer systems 124 in communication with (or implemented by) client computer system 120 that are operated for a particular entity. For example, list request 312 may request a list 132 of all target computer systems 124 implemented by target computer system 124. In various embodiments, list request 312 is received by cloud computing platform via API 122. In various embodiments, list request 312 is sent by testing computer system 110 in response to receiving scan request 310. In other embodiments, however, no scan request 310 is received and the security scan process discussed herein is initialized by testing computer system 110 sending list request 312.

In various embodiments, testing computer system 110 sends a scan start command 314 to client computer system 120 after sending test payloads 134. In such embodiments, scan start command 314 is useable by the client computer system 120 to instruct target systems 124 to start their security scans using the test payloads 134. In various embodiments, scan start command 314 is an application program interface call made to client computer system 120 via API 122. In such embodiments, for example, API 122 is operable to enable computer systems remote from client computer system 120 (such as testing computer system 110) to command client computer system 120 and various target systems 124 in communication with (or implemented by) client computer system 120 to execute any of a number of operations including the various operations in test payloads 134. In various embodiments, scan start command 314 is a separate message, but in other embodiments scan start command 314 is incorporated with test payload 134 such that target systems receive their respective test payloads 134 and execute the security scans without further command.

Figure 4:
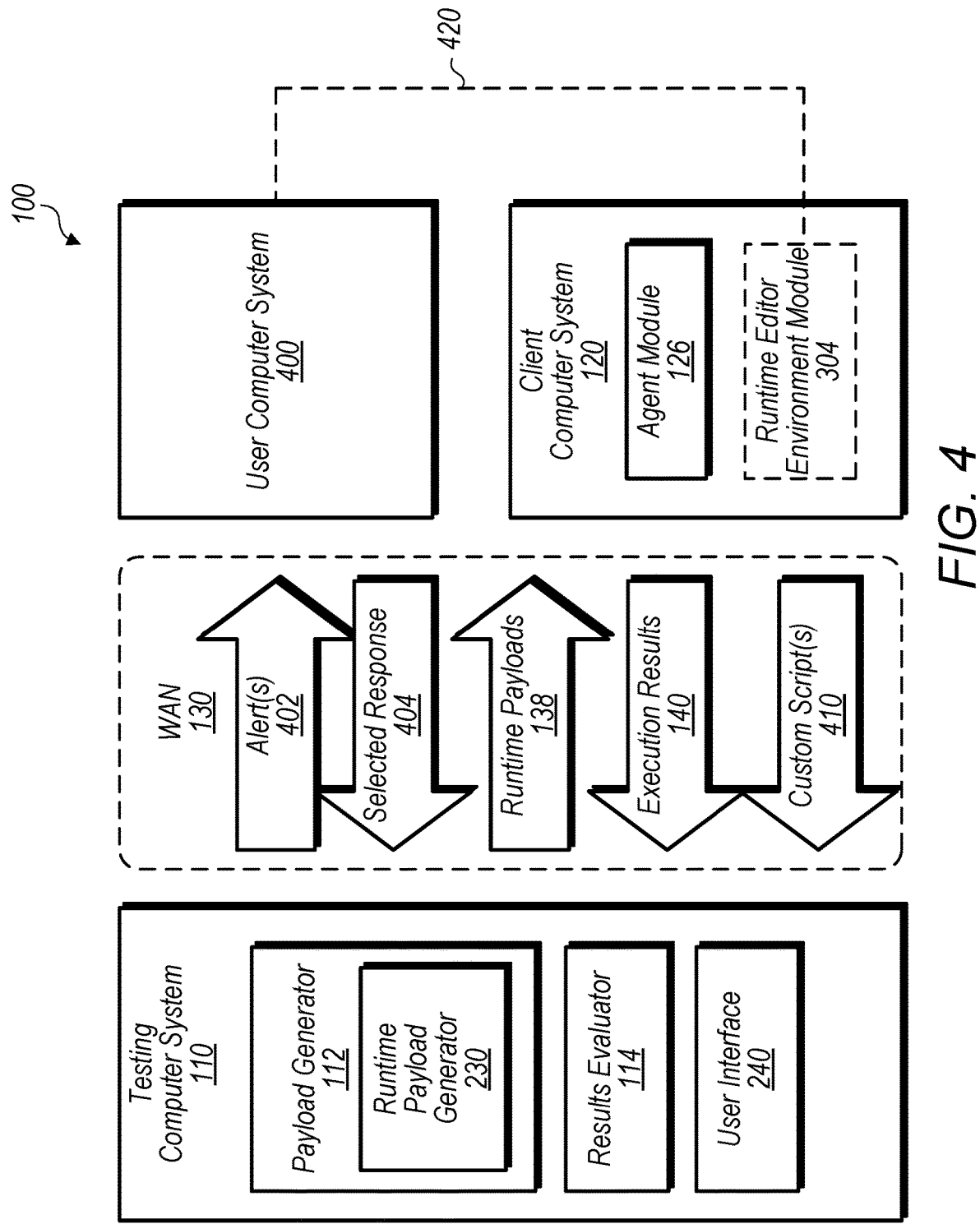
FIG. 4 is a block diagram showing the testing computer system and client computer system of FIG. 1 in communication with a user computer system in accordance with various embodiments.

Referring now to FIG. 4, a block diagram illustrating the computer system 100 depicted in FIG. 1 in communication with a user computer system 400 is depicted in accordance with various embodiments. Testing computer system 110 and client computer system 120 include various components as discussed above, but only certain components are shown in FIG. 4 for clarity. As shown in FIG. 4, testing computer system 110 is configured to communicate with user computer system 400 over WAN 130 and client computer system 120 is configured to communicate with user computer system 400 via link 420. In various embodiments, communication over link 420 includes communication over WAN 130, over a local area network, or by direct terminal access to client computer system 120 in various embodiments. In some embodiments, communication over link 420 includes user computer system 400 communicating with client computer system 120 via testing computer system 110 (e.g., using user interface 240).

User computer system 400 can be implemented by any of a number of suitable computer systems (e.g., user computer system 400 can be a single computer or server, one or more dedicated computer systems including multiple computer systems, or implemented with a cloud computing system). In various embodiments, user computer system 400 is a desktop computer, laptop computer, tablet computer, or a smartphone. In various embodiments, user computer system 400 communicates with WAN 130 using one or more wired and/or wireless communications mediums. User computer system 400 is configured to communicate with testing computer system 110 over WAN 130 (although some embodiments, user computer system 400 is configured to communicate with testing computer system 110 over a local area network or by a direct terminal access). In the embodiments shown in FIG. 4, user computer system 400 is configured to interface with testing computer system 110 using user interface 240. In such embodiments, user computer system 400 is configured to receive alerts 402 via user interface 240 and to send indications of selected responses 404. As discussed in further detail herein, user interface 240 causes the screens discussed in connection to FIGS. 9-14 to be displayed to a user using user computer system 400 (e.g., on a display coupled to user computer system 400) as part of presenting alerts 402 and receiving indications of selected responses 404, in various embodiments.

Figure 11:
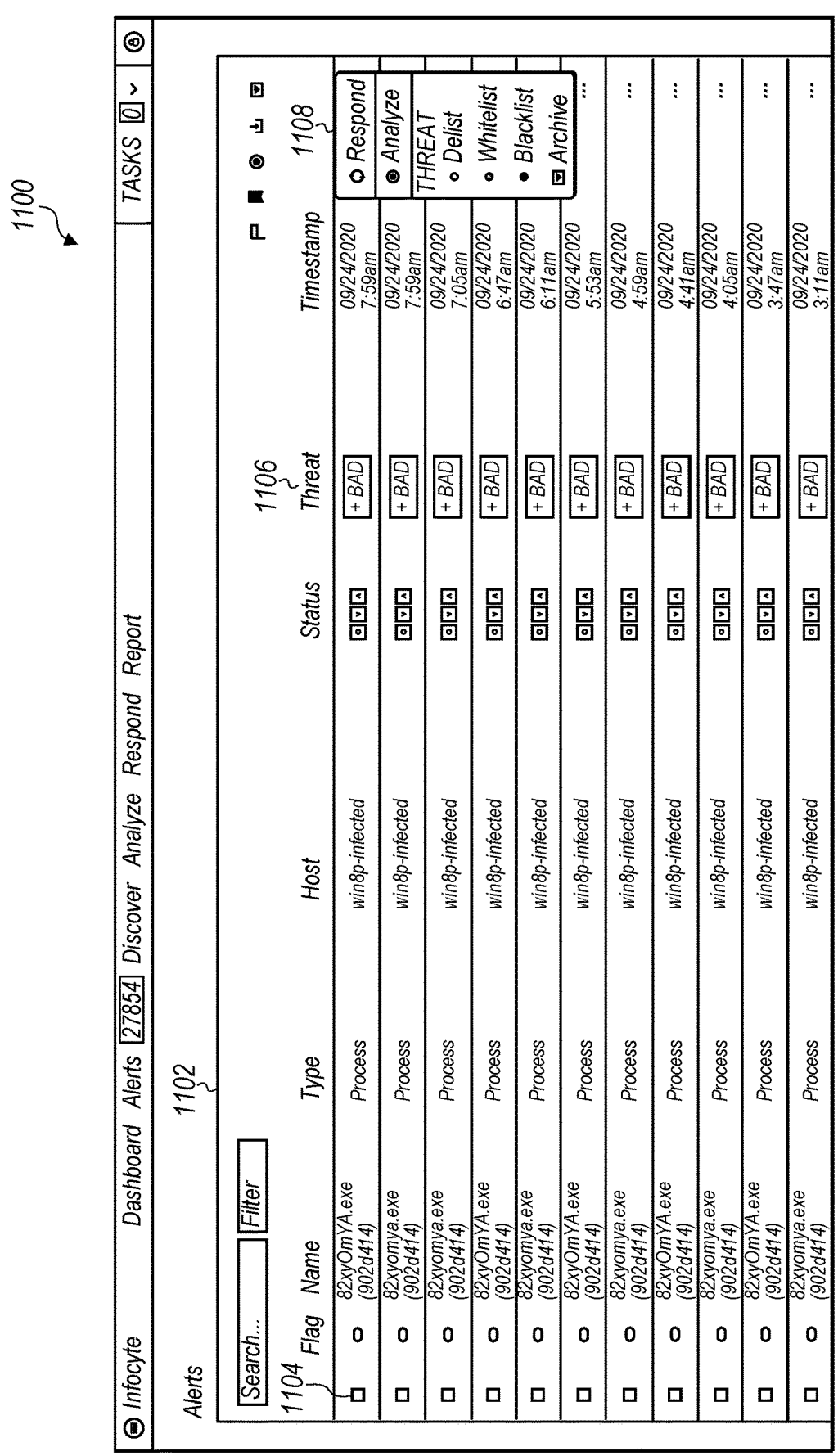
Figure 12:
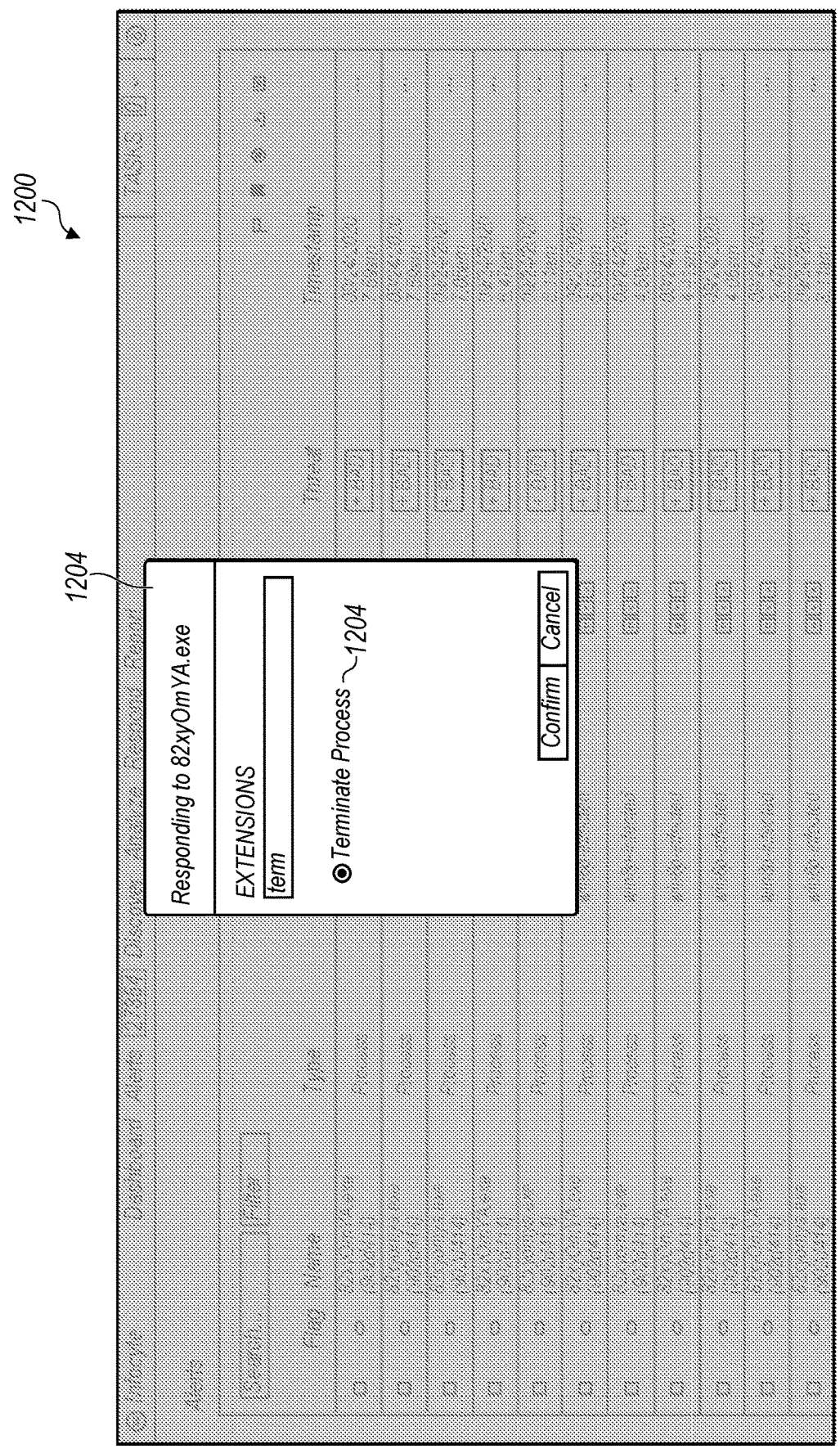

In the embodiments shown in FIG. 4, testing computer system 110 is configured to generate one or more alerts 402 and send such alerts 402 to user computer system 400 via user interface 240. In various embodiments, alerts 402 are based on an analysis of test results 136 that indicates a security breach (e.g., a malicious process running on client computer system 120 or a target system 124). Such alerts 402 are presented to a user via user interface 240 and user computer system 400, and in some instances alongside one or more selectable responses to the alert 402. Example screens of a user interface 240 displaying one or more alerts and one or more selectable responses is shown in FIGS. 11 and 12. In the embodiments shown in FIG. 4, a user is able to select from one or more responses to respond to a given alert 402. In such embodiments, the user inputs a selection via user computer system 400, which sends an indication of the selected response 404 to testing computer system 110.

As discussed herein, in various embodiments, potential selectable responses to an alert 402 that may be displayed to the user include by are not limited to:
(a) terminating one or more processes running on one or more target systems 124 (e.g., a process identified as being malicious, a process identified as malfunctioning, a process identified as being out-of-date);
(b) isolating one or more of the target systems 124 from other target systems 124 (e.g., by restricting communication with the isolated target systems 124 and other target system 124, by closing ports of the isolated target systems 124, by redirecting network traffic around the isolated target systems 124, etc.);
(c) running an additional scan of one or more target systems 124 (e.g., repeating a scan, running a full system scan);
(d) obtaining one or more log files from one or more target systems 124;
(e) installing, removing, or updating software running on one or more target systems 124;
(e) uninstalling, installing, patching, or updating software running on one or more target systems 124;
(f) rebooting client computer platform 120 and/or one or more target systems 124; and
(g) running one or more custom scripts or routines input via a runtime editor environment provided using runtime editor environment module 304.

Figure 10:
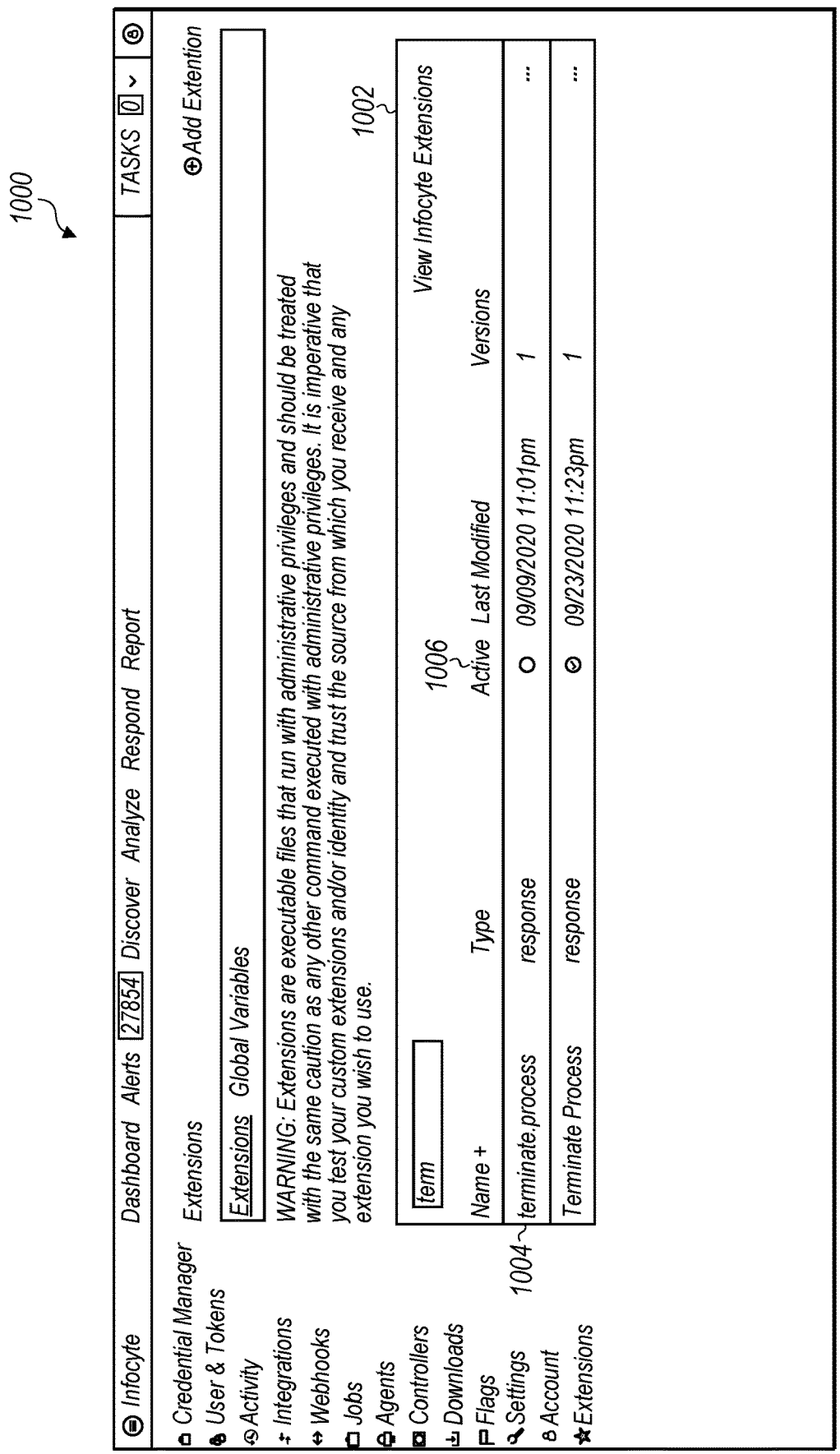

Testing computer system 110 is configured to generate runtime payloads 138 in response to the indication of the selected response 404. In the instance of items (a)-(f) above, runtime payload generator 230 is operable (using built-in runtime module 232) to compile a runtime binary tailored for the particular client computer system 120 and to send the runtime binary in a runtime payload 138. In the instance of item (g) above, runtime payload generator 230 is operable (using custom runtime module 234 and a previously-received custom script or routine corresponding to the selected customer response) to compile a runtime binary tailored for the particular client computer system 120 and to send the runtime binary for the customer response in a runtime payload 138. In various embodiments, agent module 126 running on client computer platform 120 is not operable to perform any of the responses identified above without the corresponding runtime payload 138, and after executing of the runtime payload 138, the runtime payload 138 is deleted from memory as discussed herein. In various embodiments, a user is able to browse a list of available actions (including build-in and custom actions) that may be performed via runtime payloads 138 sent to agent module 126 via user interface 240. An example screen presented by user interface 240 to user computer system 400 of a list of such available actions is depicted in FIG. 10.

Figure 9:
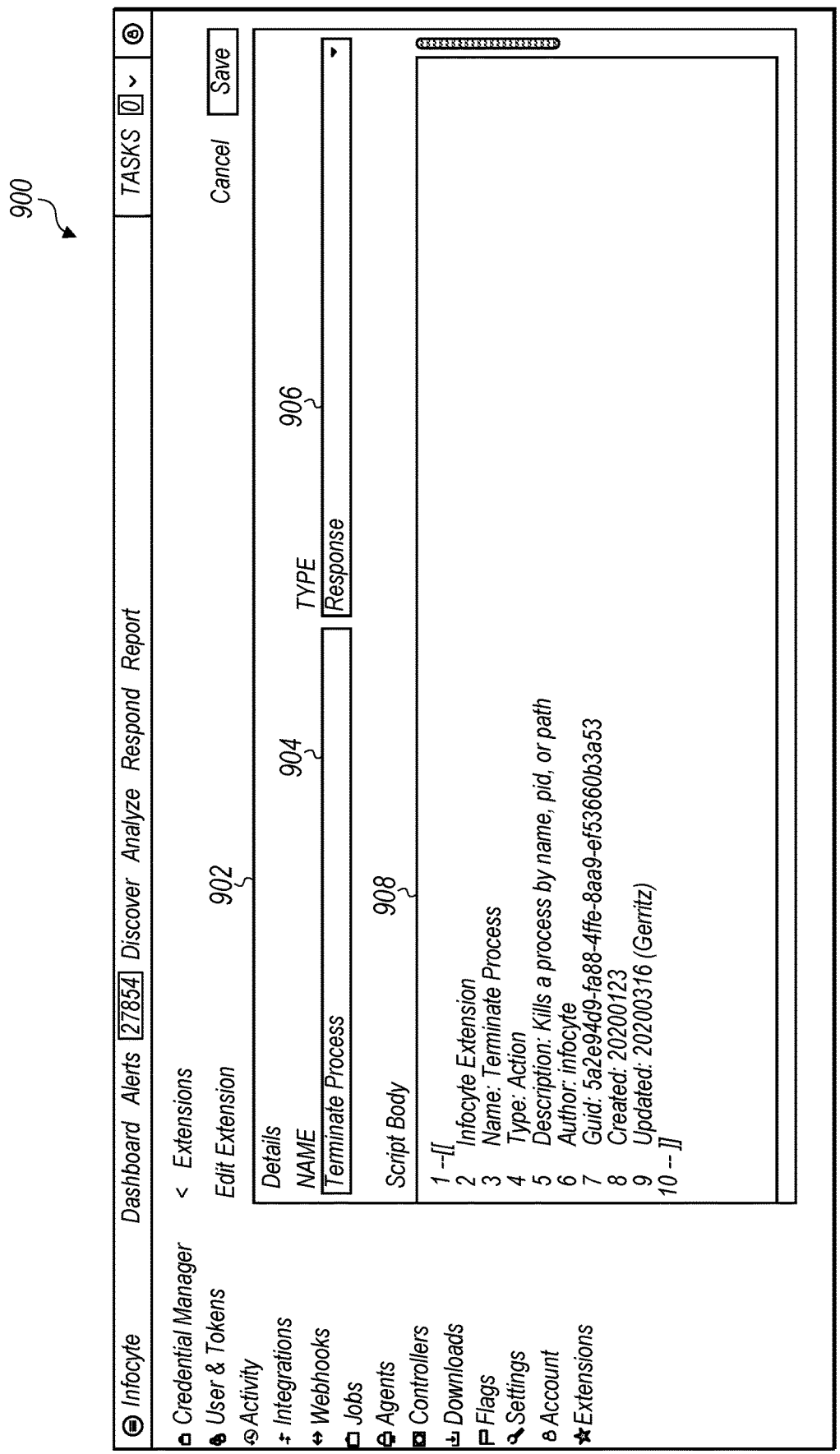
FIGS. 9-14 are example screenshots presented using the user interface of FIG. 2 in accordance with various embodiments.
Figure 13:
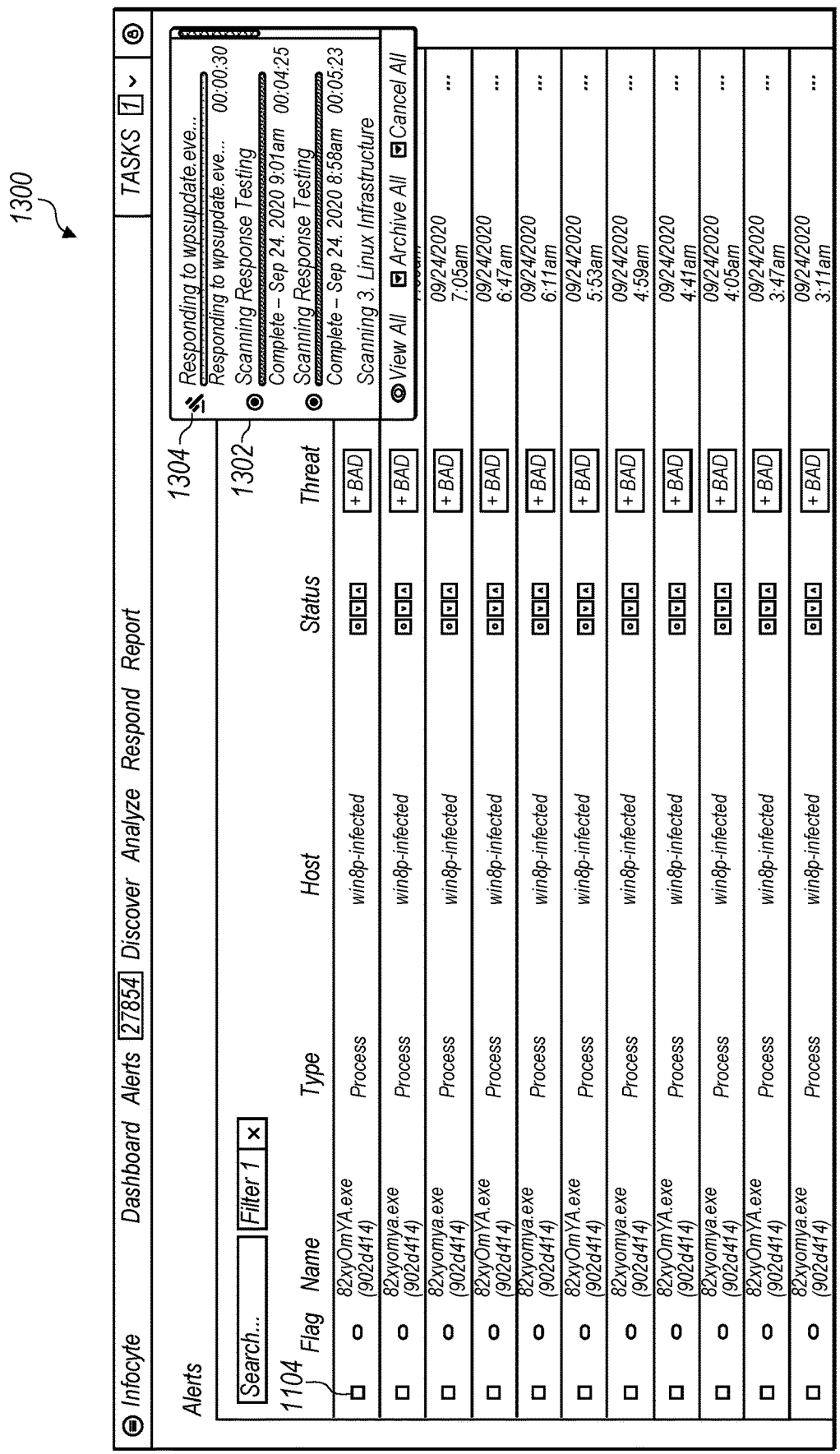
Figure 14:
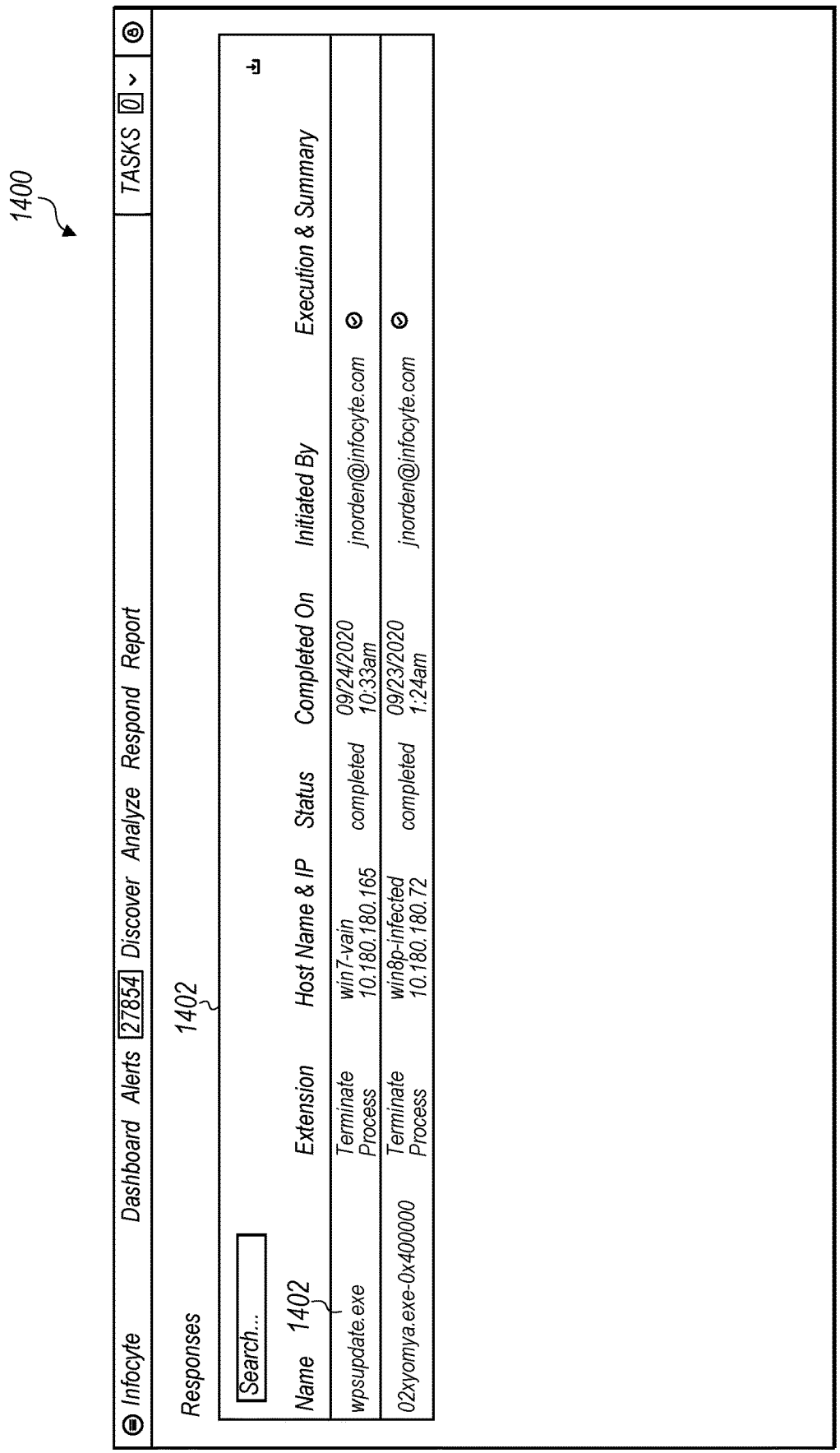

In various embodiments, a user is able to utilize user computer system 400 to input, via link 420, a custom script or routine into a runtime editor environment provided using runtime editor environment module 304. An example screen presented by user interface 240 to user computer system 400 of a runtime editor environment is depicted in FIG. 9. In various embodiments, such a custom script or routine may be written in any of a number of suitable high-level programming languages (e.g., Lua, PowerShell, JavaScript etc.). As discussed herein, in various embodiments the custom script or routine may define a user selectable response that can be executed in response to a security threat. In other instances, however, the custom script or routine can define one or more actions that can be performed at any time, regardless of whether a security threat has been detected. For example, the custom script or routine may define a software patch or update that may be distributed to client computer system 120 and/or target systems 124 regularly or when a new version is available. As another example, the custom script or routine may define one or more actions to perform on particular a target system 124 having a particular type of hardware or software (e.g., reboot a target system 124 running Windows OS into safe mode and collect the system log; perform one or more commands that specific to Amazon Web Services®, Microsoft Azure®, or Google Cloud® platforms). After a custom script or routine is entered into client computer system 120, client computer system 120 is operable to send the custom script or routine to testing computer system (shown as the arrow labeled customer script(s) 410 in FIG. 4). After receiving the custom script or routine, testing computer system 110 is operable to compile the custom script or routine to generate a runtime payload 138 for the custom script or routine as discussed herein (e.g., with runtime payload generator 230). As discussed herein, client computer system 120 performs the runtime payloads (e.g., using agent module 126) and execution results 140 may be sent from client computer system 120 to testing computer system 110. Such execution results 140 may be presented to the user via user interface 240. Example screens presented by user interface 240 including execution results 140 are depicted in FIGS. 13 and 14.

Figure 5:
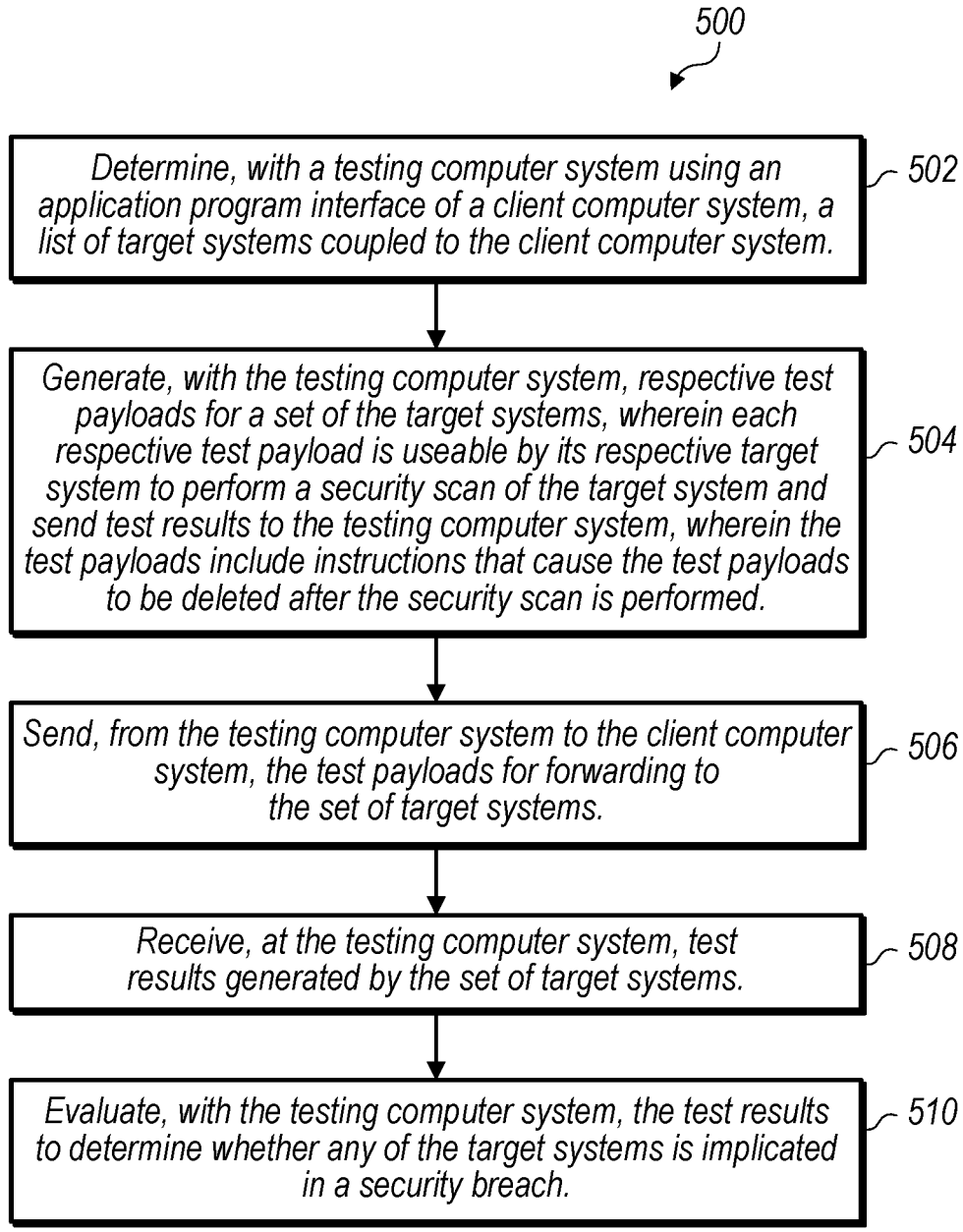
FIG. 5 is a flowchart illustrating an embodiment of a target system scanning method in accordance with various embodiments.

FIGS. 5-8 depict flowcharts representing various disclosed methods implemented with the components depicted in FIG. 1. Referring now to FIG. 5, a flowchart illustrating an embodiment of a target system scanning method 500 is shown. In the embodiment shown in FIG. 4, the various actions associated with method 500 are implemented by testing computer system 110 in communication with client computer system 120 and target systems 124. At block 502, testing computer system 110 determines, using API 122 of client computer system 120, a list 132 of target systems 124 coupled to the client computer system 120. At block 504, testing computer system 110 generates respective test payloads 134 for a set of the target systems 124. Each respective test payload 134 is useable by its respective target system 124 to perform a security scan of the target system 124 and send test results 136 to the testing computer system 110. Each test payload 134 includes instructions that cause the test payloads 134 to be deleted after the security scan is performed. At block 506, testing computer system 110 sends test payloads 134 to client computer system 120 for forwarding to the set of target systems 124. At block 508, testing computer system 110 receives test results 136. At block 510, testing computer system 110 evaluates test results 136 to determine whether any of target systems 124 is implicated in a security breach.

Figure 6:
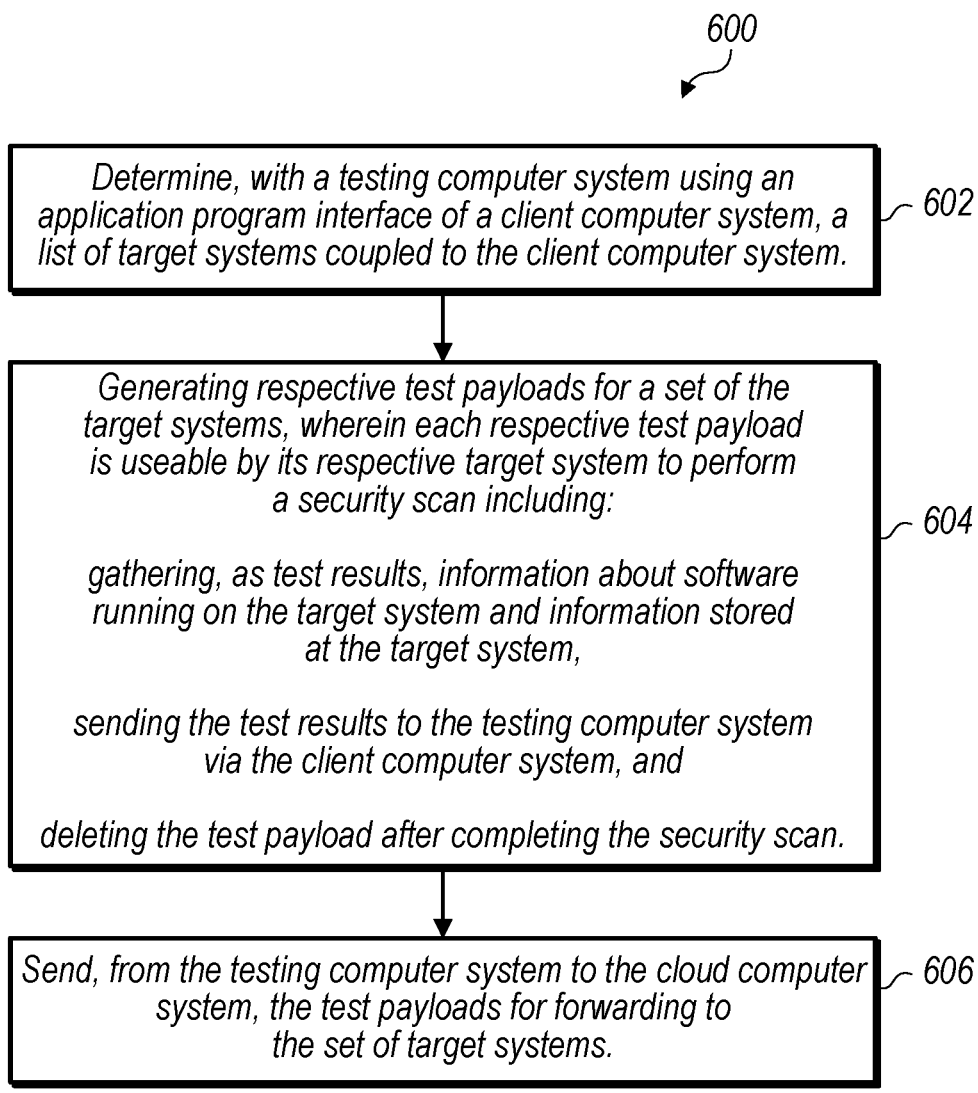
FIG. 6 is a flowchart illustrating an embodiment of a target system scanning method in accordance with various embodiments.

Referring now to FIG. 6, a flowchart illustrating an embodiment of a target system scanning method 600 is shown. In the embodiment shown in FIG. 6, the various actions associated with method 600 are implemented by testing computer system 110 in communication with client computer system 120 and target systems 124. At block 602, testing computer system 110 determines, using an API 122 of client computer system 120, a list 132 of target systems 124 coupled to the client computer system 120. At block 604, testing computer system 110 generates respective test payloads 134 for a set of the target systems 124. Each respective test payload 134 is useable by its respective target system 124 to perform a security scan including: gathering, as test results 136, information about software running on the target system 124 and information stored at the target system 124, sending test results 136 to testing computer system 110, and deleting test payload 134 after completing the security scan. At block 606, testing computer system 110 sends test payloads 134 to client computer system 120 for forwarding to the set of target systems 124.

Figure 7:
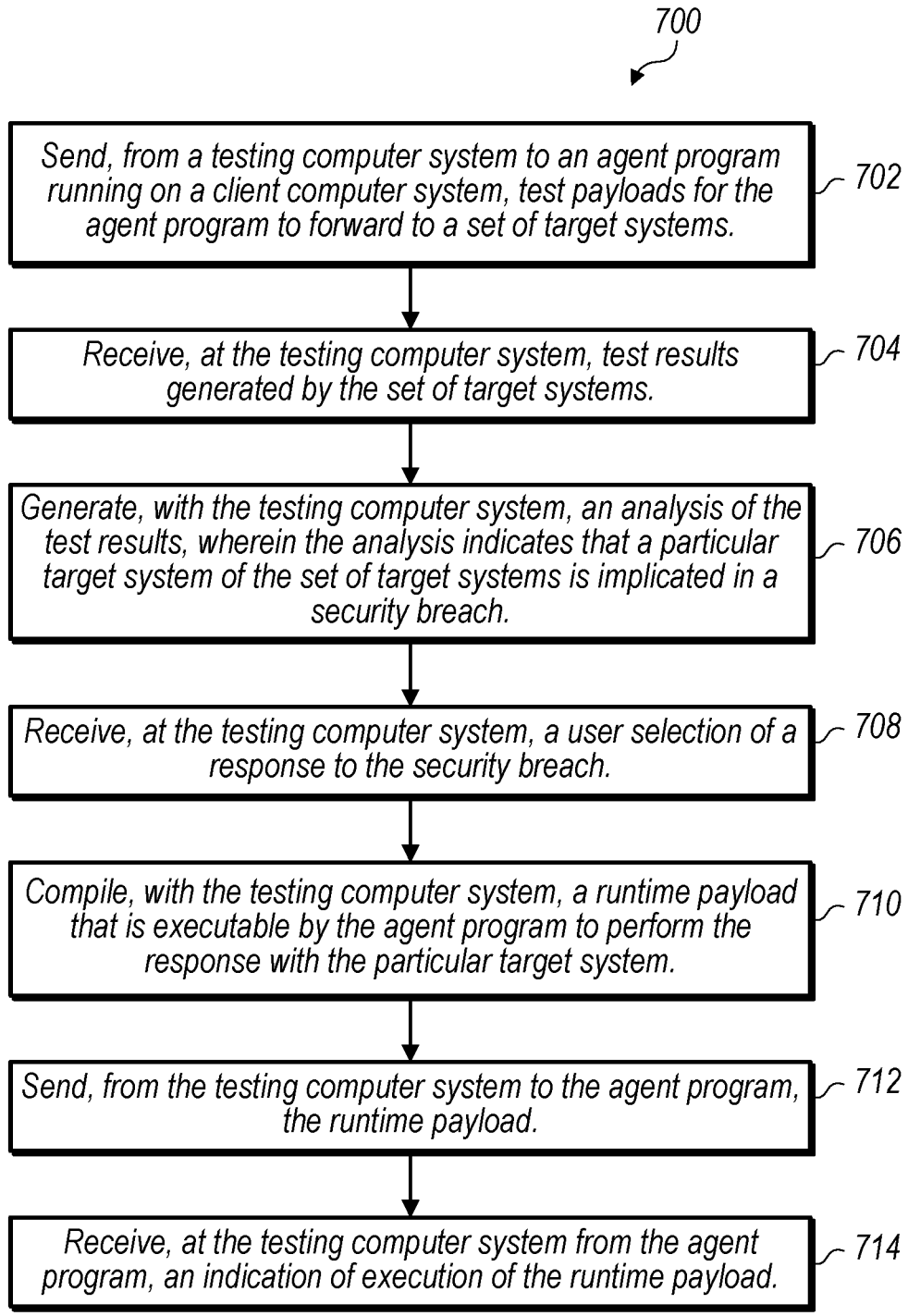
FIG. 7 is a flowchart illustrating an embodiment of a system scanning and response method in accordance with various embodiments.

Referring now to FIG. 7, a flowchart illustrating an embodiment of a system scanning and response method 700 is shown. At block 702, testing computer system 110 sends, to an agent program (e.g., agent module 126) running on a client computer system 120, one or more test payloads 134 for the agent program to forward to a set of target systems 124. At block 704, testing computer system 110 receives rest results 136 generated by the set of target systems 124. At block 706, testing computer system 110 generates an analysis of the test results 136. The analysis indicates that a particular target system 124 of the set of target systems 124 is implicated in a security breach. At block 708, testing computer system 110 receives a user selection of a response to the security breach. At block 710, testing computer system 110 compiles one or more runtime payloads 138 that are executable by the agent program (e.g., agent module 126) to perform the response with the particular target system 124. At block 712, testing computer system 110 sends to the one or more runtime payloads 138 to the agent program. At block 714, testing computer system 110 receives from the agent program an indication of execution of the runtime payload (e.g., execution results 140).

Figure 8:
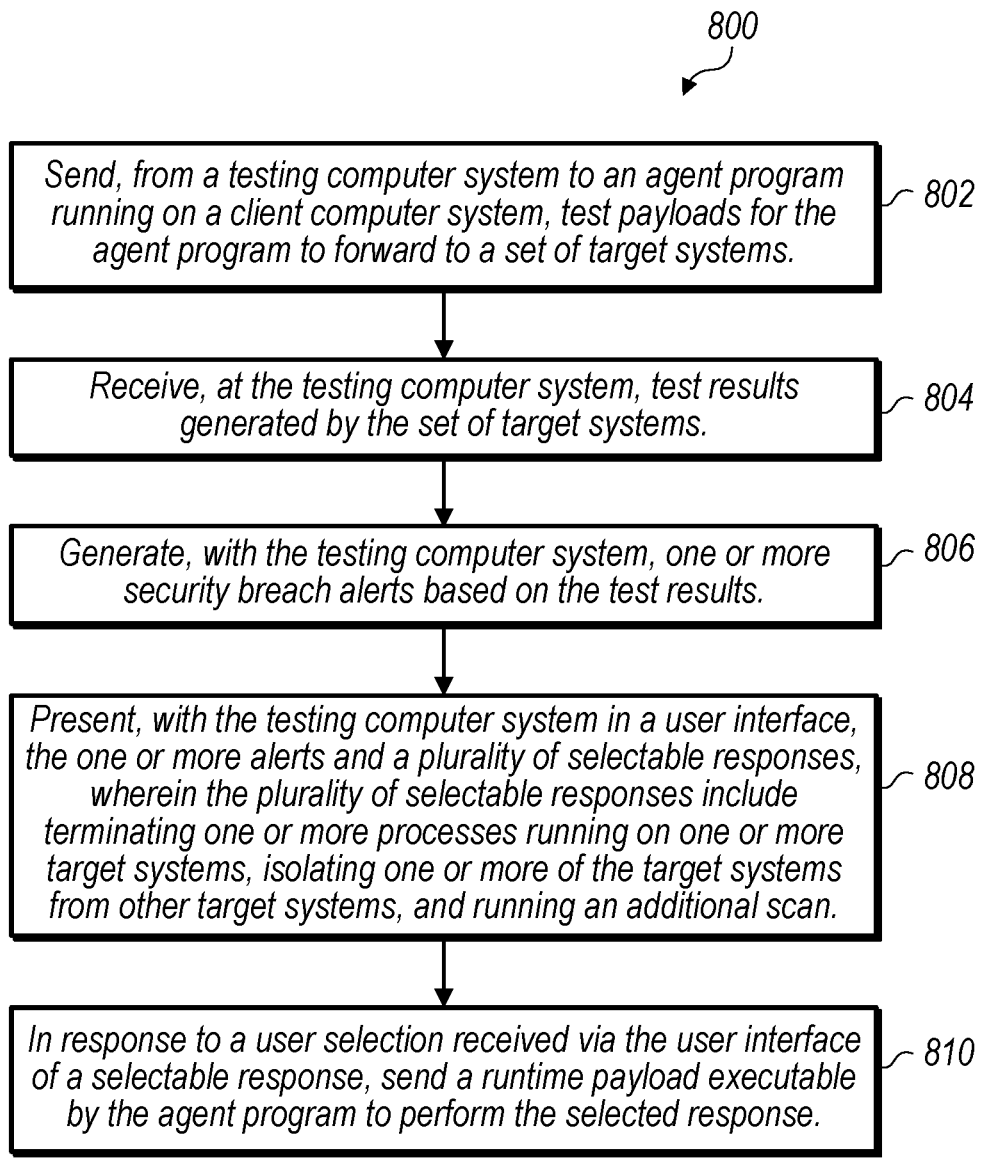
FIG. 8 is a flowchart illustrating an embodiment of a system scanning and response method in accordance with various embodiments.

Referring now to FIG. 8, a flowchart illustrating an embodiment of a system scanning and response method 800 is shown. At block 802, testing computer system 110 sends, to an agent program (e.g., agent module 126) running on a client computer system 120, one or more test payloads 134 for the agent program to forward to a set of target systems 124. At block 804, testing computer system 110 receives test results 136 generated by the set of target systems 124. At block 806, testing computer system 110 generates one or more security breach alerts (e.g., one or more alerts 402). At block 808, testing computer system 110 presents in a user interface 240, the one or more alerts (e.g., alerts 402) and a plurality of selectable responses (e.g., depicted in screens 1100 and 1200). In various embodiments, the plurality of selectable responses includes terminating one or more processes running on one or more target systems, isolating one or more of the target systems from other target systems, and running an additional scan. At block 810, in response to a user selection received via the user interface 240 of a selectable response (e.g., a selected response 404 input via user interface 240), testing computer system 110 sends one or more runtime payloads 138 executable by the agent program to perform the selected response.

Referring now to FIGS. 9-14 example screens of a user interface (e.g., presented using user interface 240) presented to a user computer system 400 are shown. Referring now to FIG. 9, a screen 900 is depicted. Screen 900 includes a window 902 that allows a user to enter a custom script or routine into a runtime editor environment provided using runtime editor environment module 304. In the depicted embodiment, a user is able to enter a name for the customer script or routine into name field 904 and select a type from dropdown menu 906. In the depicted embodiment, the custom routine shown in screen 900 labeled as a response (e.g., an action to perform in response to a security breach identified in a security scan), but other labels may be used such as "Analysis" (e.g., for actions to gather addition information from target systems 124), "Install" (e.g., for actions to install software, "Update" (e.g., for actions to update software"), etc. In various embodiments, a user may apply any desired label to a custom script or routine. In text box 908, a text editor is presented allowing a user to add, change, or delete code for the custom script or routine. The code shown in FIG. 9 relates to a script that terminates a process written in Lua, but as discussed herein, a user is able to enter any code that may be executed by client computer platform 120 written in any suitable language.

Referring now to FIG. 10, a screen 1000 includes a list 1002 of the actions 1004 (also referred to herein as "extensions") that are available. Using toggle 1006, a user can enable or disable an action 1004. Referring now to FIG. 11, a screen 1100 includes a list 1102 of entries 1104 corresponding to alerts 402. In the embodiment shown in FIG. 11, the entries 1104 include the name of the software identified to be a threat, a type (e.g., process, artifacts, modules, drivers, memory, accounts, applications, network connections, etc.), an indicator of the host running the identified threat (e.g., a network name of the corresponding target system 124 running the identified threat), a status of the identified threat (e.g., whether it is currently running), a threat level 1106 assigned to the identified threat, a timestamp, and a menu 1108 of available actions. In the embodiment shown in FIG. 11, menu 1108 includes selections for a response (e.g., causing a runtime payload 138 to be sent to client computer platform 120 as discussed herein), analyze (e.g., see more information collected about identified threat), as well as actions to control list 1102 such as adding the identified threat to a blacklist or whitelist, removing an entry 1104 from list 1102, and archiving an entry 1104. In various embodiments, threat level 1106 is determined using a combination of collected threat intelligence and analysis conducted by one or more Bayesian machine learning algorithms and data science using entropy methods. These are then weighted and used to determine the threat of the item. If a user selects "response" in the embodiment shown in FIG. 11, a screen 1200 as shown in FIG. 12 may be presented. Screen 1200 include a popup 1202 that include a list of available actions 1204 that may be executed as a response. While FIG. 12 only includes a "terminate process" response, it will be understood that any of the responses discussed herein may be included in popup 1202 in various instances (e.g., a selectable response to update software running on a particular target system 124, a selectable response to reboot a particular target system 124, etc.). When a user makes a selection in popup 1202, an indication of selected response 404 is sent to testing computer system 110, one or more runtime payloads 138 corresponding to the response are generated, and such runtime payloads 138 are sent to client computer platform 120 as discussed herein.

Referring now to FIGS. 13 and 14, screens 1300 and 1400 showing information indicative of execution results 140 are shown. In screen 1300, a popup 1302 is overlaid on screen 1100 discussed in reference to FIG. 11. Popup 1302 include a list of entries 1304 that correspond to individual selected responses that are being executed or have previously been executed by client computer system 120 with an indication of the status of each (e.g., in progress, completed, aborted, etc.). If a user selects "view all," screen 1400 is presented showing additional information about the various responses. Screen 1400 includes a list 1402 of entries 1404 that correspond to individual selected responses that are being executed or have previously been executed by client computer system 120 with an indication of the status of each (e.g., in progress, completed, aborted, etc.).

Exemplary Computer System

Figure 15:
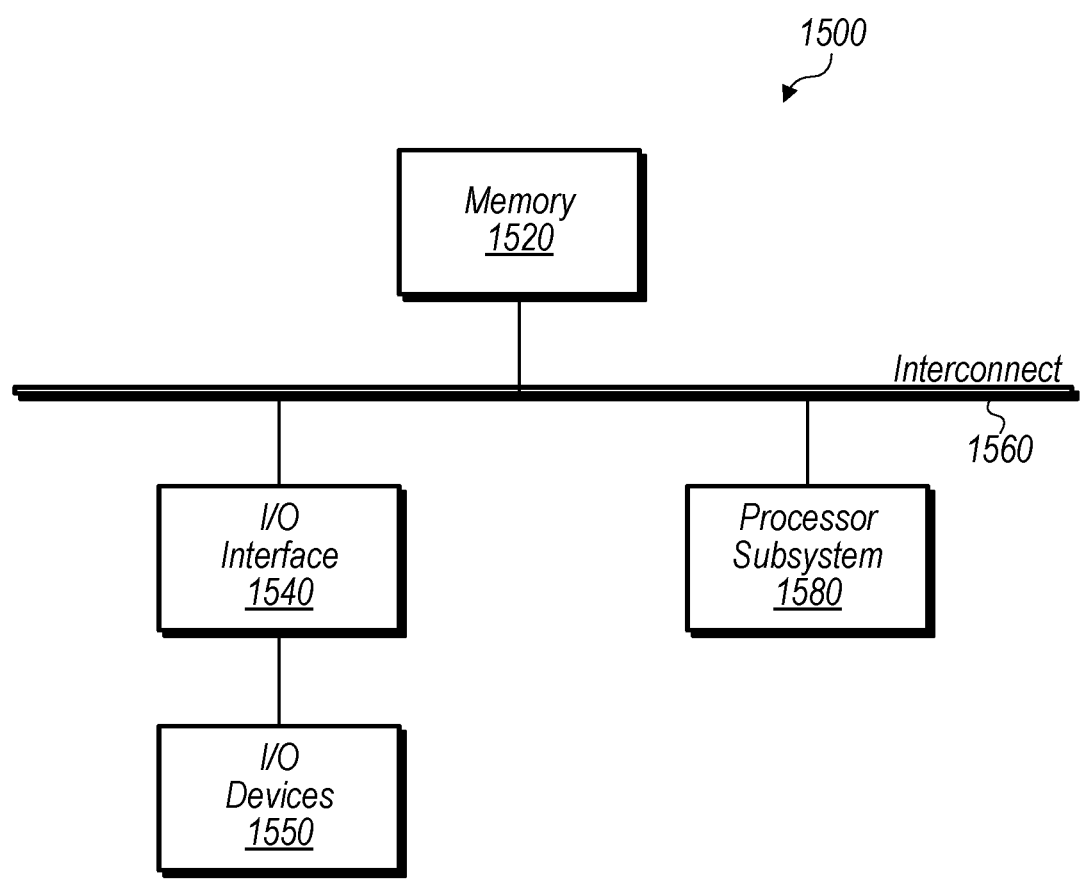
FIG. 15 is a block diagram of an exemplary computer system, which may implement the various components of FIGS. 1-4.

Turning now to FIG. 15, a block diagram of an exemplary computer system 1500, which may implement the various components of computer system 100 (e.g., testing computer system 110, client computer system 120, target systems 124) is depicted. Computer system 1500 includes a processor subsystem 1580 that is coupled to a system memory 1520 and I/O interfaces(s) 1540 via an interconnect 1560 (e.g., a system bus). I/O interface(s) 1540 is coupled to one or more I/O devices 1550. Computer system 1500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1500 is shown in FIG. 15 for convenience, system 1500 may also be implemented as two or more computer systems operating together.

Processor subsystem 1580 may include one or more processors or processing units. In various embodiments of computer system 1500, multiple instances of processor subsystem 1580 may be coupled to interconnect 1560. In various embodiments, processor subsystem 1580 (or each processor unit within 1580) may contain a cache or other form of on-board memory.

System memory 1520 is usable to store program instructions executable by processor subsystem 1580 to cause system 1500 perform various operations described herein. System memory 1520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1500 is not limited to primary storage such as memory 1520. Rather, computer system 1500 may also include other forms of storage such as cache memory in processor subsystem 1580 and secondary storage on I/O Devices 1550 (e.g., a hard drive, storage array, etc.). In some embodiments, these other forms of storage may also store program instructions executable by processor sub system 1580.

I/O interfaces 1540 may be any of various types of interfaces configured to couple to and communicate with other devices, according to various embodiments. In one embodiment, I/O interface 1540 is a bridge chip (e.g., Southbridge) from a front-side to one or more back-side buses. I/O interfaces 1540 may be coupled to one or more I/O devices 1550 via one or more corresponding buses or other interfaces. Examples of I/O devices 1550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1500 is coupled to a network via a network interface device (e.g., configured to communicate over WiFi, Bluetooth, Ethernet, etc.), another example of an I/O device 1550.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
sending, from a testing computer system to an agent program running on a client computer system, test payloads for the agent program to forward to a set of target systems;
sending, from the testing computer system to the agent program, a scan start command after sending the test payloads, wherein the scan start command is a separate message from the test payloads;
receiving, at the testing computer system, test results generated by the set of target systems;
generating, with the testing computer system, an analysis of the test results, wherein the analysis indicates that a particular target system of the set of target systems is implicated in a security breach;
receiving, at the testing computer system, a user selection of a response to the security breach;
compiling, with the testing computer system, a runtime payload that is executable by the agent program to perform the response with the particular target system;
sending, from the testing computer system to the agent program, the runtime payload; and
receiving, at the testing computer system from the agent program, an indication of execution of the runtime payload.

2. The method of claim 1, further comprising:
receiving, at the testing computer from the agent program, a customized response, wherein the customized response was input by a user in a high-level programming language in a development environment provided by the agent program;
wherein the selected response is the customized response and wherein the runtime payload is compiled from the customized response.

3. The method of claim 1,
wherein the security breach is caused by a particular process running on the particular target system; and
wherein the selected response is to terminate the particular process.

4. The method of claim 1,
wherein the selected response is to isolate the particular target system from one or more other target systems.

5. The method of claim 1,
wherein the selected response is to perform an additional scan of the particular target system.

6. The method of claim 1,
wherein the testing computer system and the client computer system communicate over a wide area network, and wherein one or more target systems have only indirect access to the wide area network via the client computer system.

7. The method of claim 1,
wherein the agent program is not operable to perform the response without receiving the runtime payload; and
wherein the runtime payload is deleted from the client computer system after being executed.

8. A non-transitory, computer-readable medium storing instructions that when executed by a computer system cause the computer system to perform operations comprising:
sending, from a testing computer system to a client computer system, test payloads for the client computer system to forward to a set of target systems;
sending, from the testing computer system to the client computer system, a scan start command after sending the test payloads, wherein the scan start command is a separate message from the test payloads;
receiving, at the testing computer system, test results generated by the set of target systems;
generating, with the testing computer system, an analysis of the test results, wherein the analysis indicates that a particular target system of the set of target systems is implicated in a security breach;
presenting, to a user, one or more selectable actions for the client computer system to perform with the particular target system in response to the security breach;
in response to a user selection of one or the selectable actions, sending, from the testing computer system to the client computer system, a runtime payload executable by the client computer system to perform the response; and
receiving, at the testing computer system, an indication of execution of the runtime payload.

9. The computer-readable medium of claim 8, wherein one or more of the target systems is implemented by the client computer system.

10. The computer-readable medium of claim 8, wherein one or more of the target systems is implemented within a private cloud of the client computer system.

11. The computer-readable medium of claim 8, wherein one or more of the target systems is implemented on a third computer system that is remote from the client computer system.

12. The computer-readable medium of claim 8, wherein the response is to install software on the particular target system.

13. The computer-readable medium of claim 8, wherein the response is to obtain one or more log files from the particular target system.

14. The computer-readable medium of claim 8, wherein the response is to reboot the particular target system.

15. A method comprising:
sending, from a testing computer system to an agent program running on a client computer system, test payloads for the agent program to forward to a set of target systems;
sending, from the testing computer system to the agent program, a scan start command after sending the test payloads, wherein the scan start command is a separate message from the test payloads;
receiving, at the testing computer system, test results generated by the set of target systems;
generating, with the testing computer system, one or more security breach alerts based on the test results;
presenting, with the testing computer system in a user interface, the one or more alerts and a plurality of selectable responses, wherein the plurality of selectable responses include terminating one or more processes running on one or more target systems, isolating one or more of the target systems from other target systems, and running an additional scan; and
in response to a user selection received via the user interface of a selectable response, sending a runtime payload executable by the agent program to perform the selected response.

16. The method of claim 15, further comprising:
receiving, at the testing computer from the agent program, a customized response, wherein the customized response was input by a user in a high-level programming language in a development environment provided by the agent program;
wherein plurality of selectable responses includes the customized response.

17. The method of claim 15,
wherein the agent program is not operable to terminate processes, isolate target systems, or run additional scans without receiving the runtime payload; and
wherein the runtime payload is deleted from the client computer system after being executed.

18. The method of claim 15, wherein one or more of the target systems is implemented by the client computer system.

19. The method of claim 15, wherein one or more of the target systems is implemented within a private cloud of the client computer system.

20. The method of claim 15, wherein one or more of the target systems is implemented on a third computer system that is remote from the client computer system.

21. A method comprising:
sending, from a testing computer system to an agent program running on a client computer system, test payloads for the agent program to forward to a set of target systems;
sending, from the testing computer system to the agent program, a scan start command after sending the test payloads, wherein the scan start command is a separate message from the test payloads;
receiving, at the testing computer system, test results generated by the set of target systems;

generating, with the testing computer system, one or more security breach alerts based on the test results;

presenting, with the testing computer system in a user interface, the one or more alerts and a plurality of selectable responses, wherein the plurality of selectable responses include terminating one or more processes running on one or more target systems, isolating one or more of the target systems from other target systems, running an additional scan and running a custom script or routine into a runtime editor environment, wherein the custom script or routine may define one or more actions to perform on one or more target systems; and in response to a user selection received via the user interface of a selectable response, sending a runtime payload executable by the agent program to perform the selected response.

\* \* \* \* \*